United States Patent [19]
Yamashita et al.

[11] Patent Number: 5,826,154
[45] Date of Patent: Oct. 20, 1998

[54] COPIER

[75] Inventors: Toshiki Yamashita, Tokyo; Jun Doi, Kawasaki; Tomonori Fukui, Tokyo; Fumio Kawamura, Yamato; Jyouji Katoh, Yokohama; Yasuo Kawada, Kawasaki, all of Japan

[73] Assignee: Ricoh Company, Ltd., Tokyo, Japan

[21] Appl. No.: 654,671

[22] Filed: May 29, 1996

[30] Foreign Application Priority Data

May 30, 1995 [JP] Japan .................................. 7-131458

[51] Int. Cl.⁶ .................................................. G03G 15/00
[52] U.S. Cl. ...................... 399/364; 271/225; 271/184; 271/265.02; 399/388; 399/397; 399/401; 399/402
[58] Field of Search ...................... 399/364, 383, 399/388, 397, 401, 402; 271/3.01, 3.03, 3.06, 3.13, 3.17, 225, 264, 265.01, 265.02, 184–186, 902

[56] References Cited

U.S. PATENT DOCUMENTS

| | | |
|---|---|---|
| 4,659,207 | 4/1987 | Maekawa ................................ 399/204 |
| 4,761,001 | 8/1988 | Hayakawa et al. ..................... 271/3.01 |
| 4,958,198 | 9/1990 | Hamakawa .............................. 399/364 |
| 5,088,714 | 2/1992 | Nagasawa et al. ..................... 271/3.08 |
| 5,095,371 | 3/1992 | Tanaka et al. .......................... 358/300 |
| 5,323,212 | 6/1994 | Fukui et al. . |
| 5,440,372 | 8/1995 | Ito et al. . |
| 5,467,181 | 11/1995 | Doi . |
| 5,493,365 | 2/1996 | Matsui et al. . |
| 5,504,590 | 4/1996 | Kawada et al. . |
| 5,506,657 | 4/1996 | Ito et al. . |
| 5,655,173 | 8/1997 | Hirai et al. .......................... 399/402 X |

FOREIGN PATENT DOCUMENTS

| | | |
|---|---|---|
| 4023513 A1 | 2/1991 | Germany . |
| 4321258 A1 | 4/1994 | Germany . |
| 2560417 C2 | 7/1995 | Germany . |
| 61-48828 | 3/1986 | Japan . |
| 63-313172 | 12/1988 | Japan . |
| 1-210971 | 8/1989 | Japan . |
| 2-8163 | 1/1990 | Japan . |

*Primary Examiner*—Matthew S. Smith
*Attorney, Agent, or Firm*—Oblon, Spivak, McClelland, Maier & Neustadt, P.C.

[57] ABSTRACT

A photocopier having a duplex copy unit unable to stack a plurality of recording media thereon, wherein an image scanner is controlled such that the scanner reads the first document, then reads the first document and the second document alternately, and finally reads the second document. A medium feed device and the duplex copy unit are controlled such that one recording medium is fed from the medium feed device, then recording media are alternately fed from the medium feed device and duplex copy unit one at a time, and finally one recording media is fed from the duplex copy unit, thereby reducing the period of time necessary for reproducing the images of a document or documents on both sides of recording media and enhancing the productivity of the copier.

6 Claims, 19 Drawing Sheets

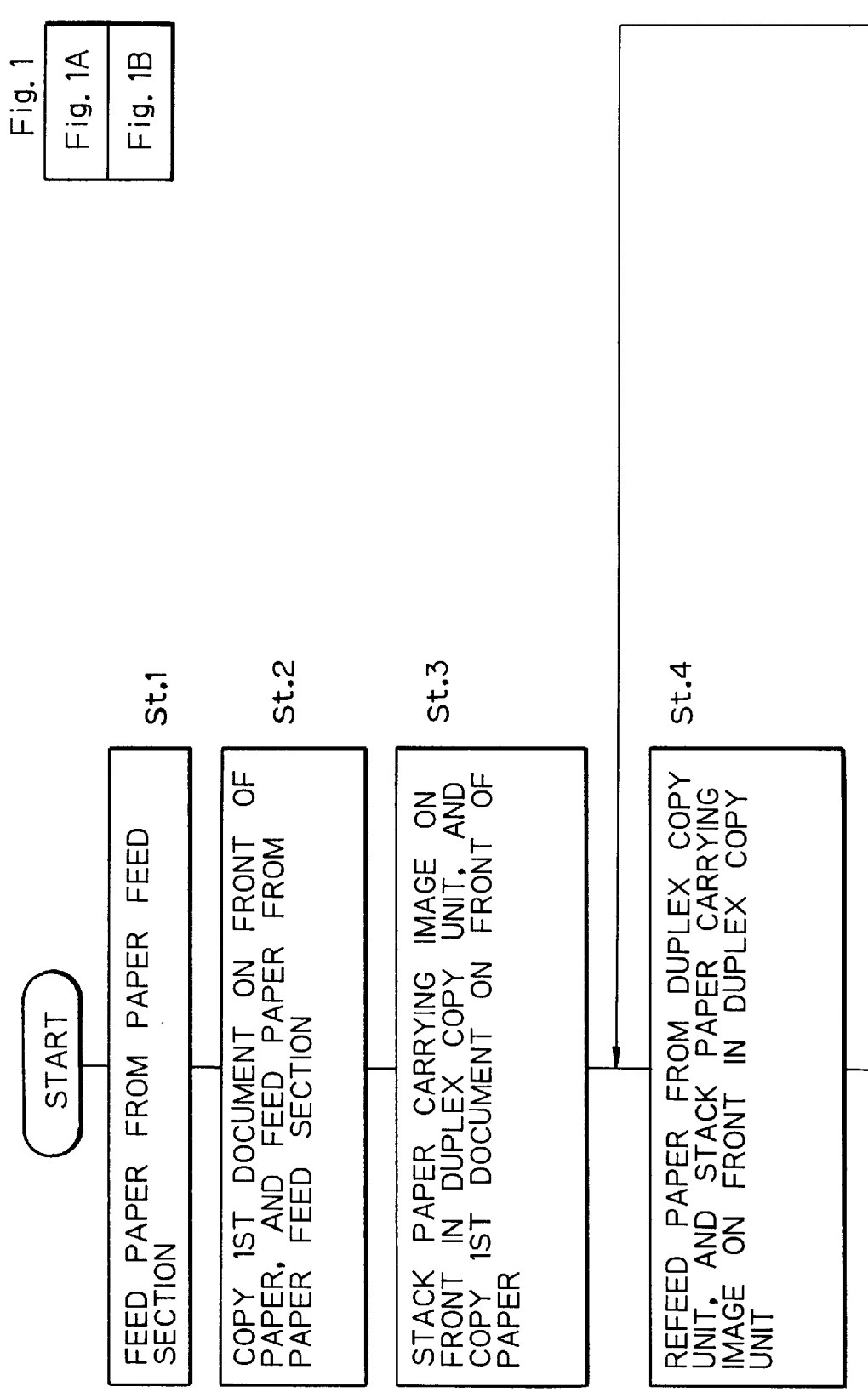

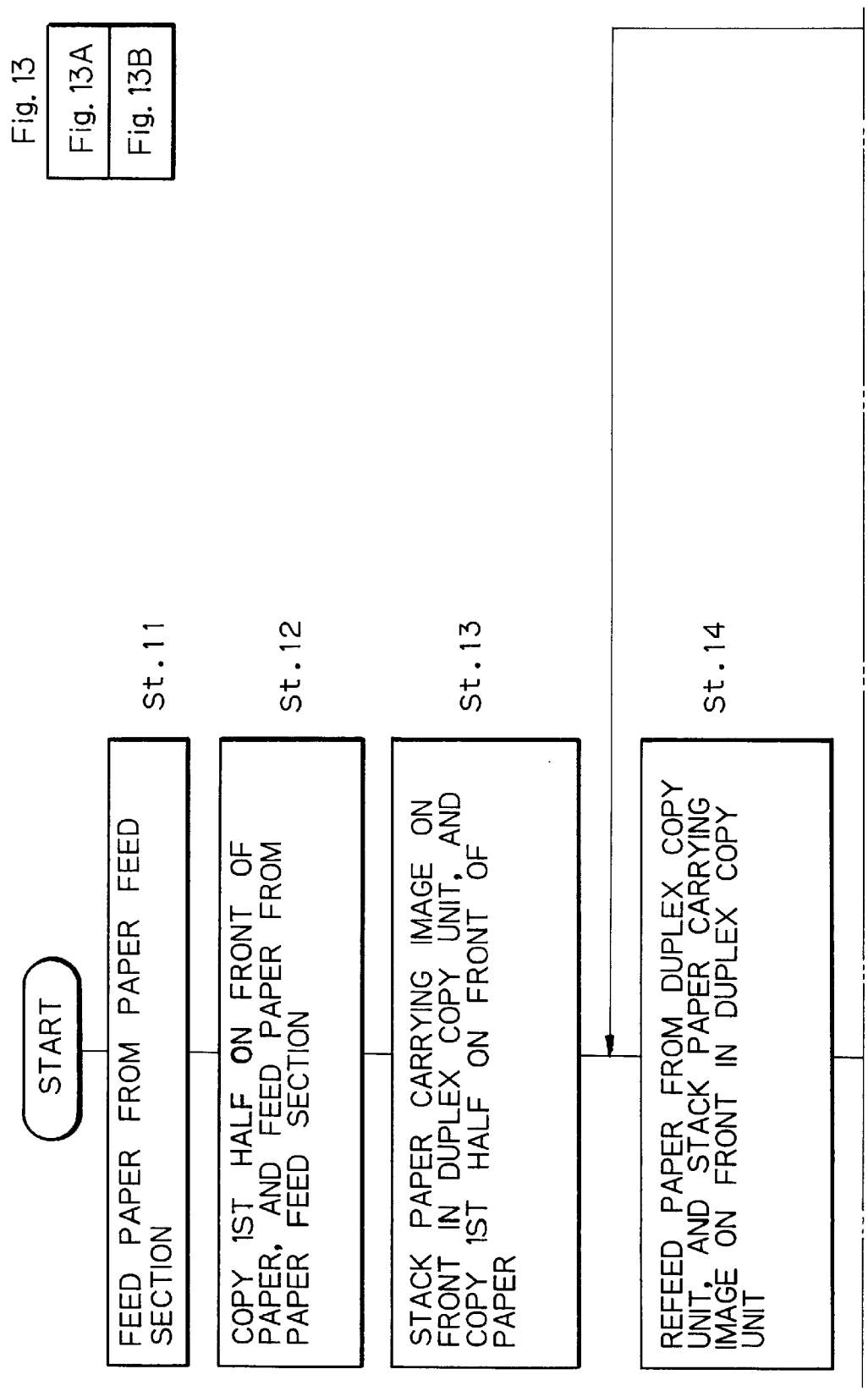

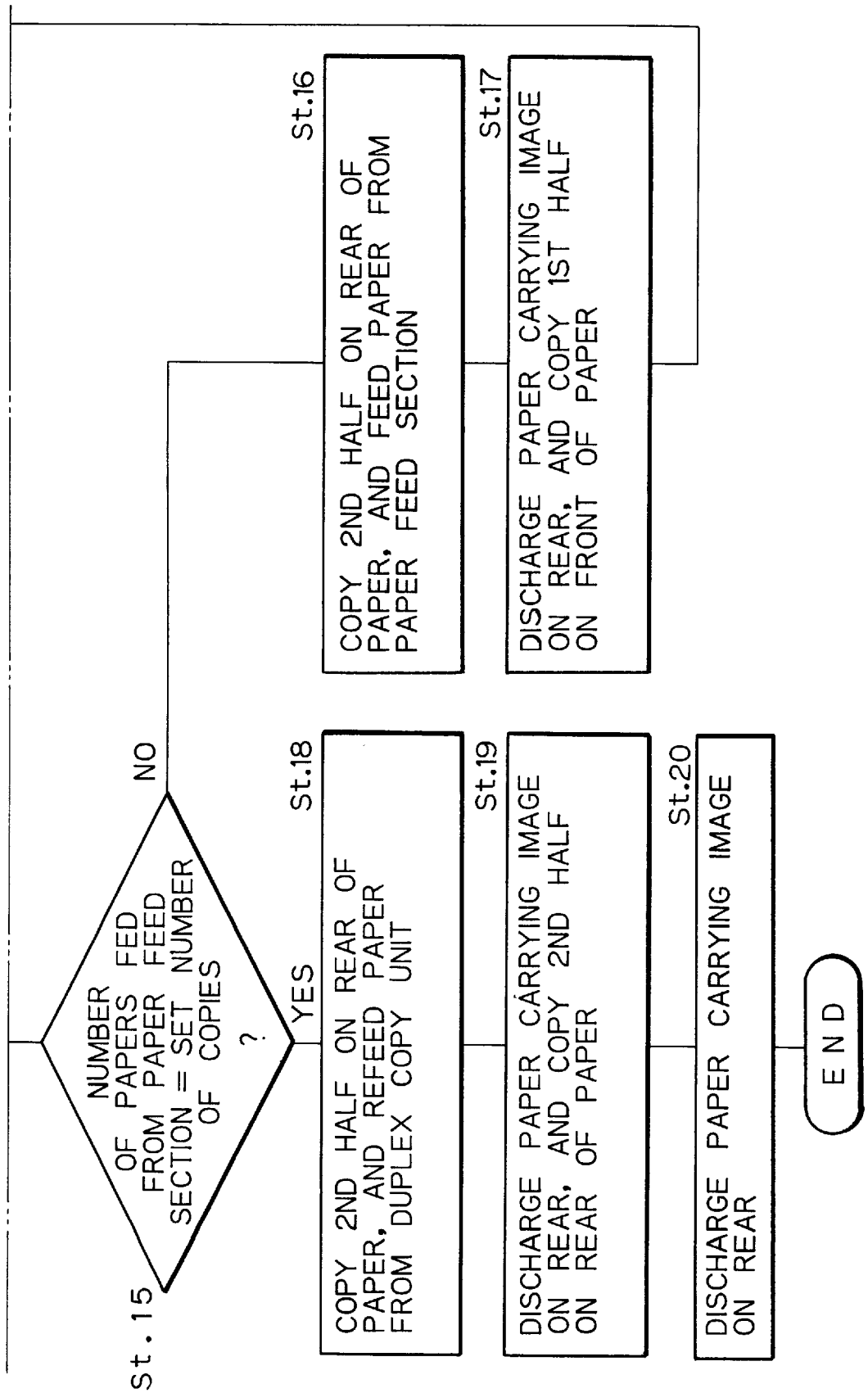

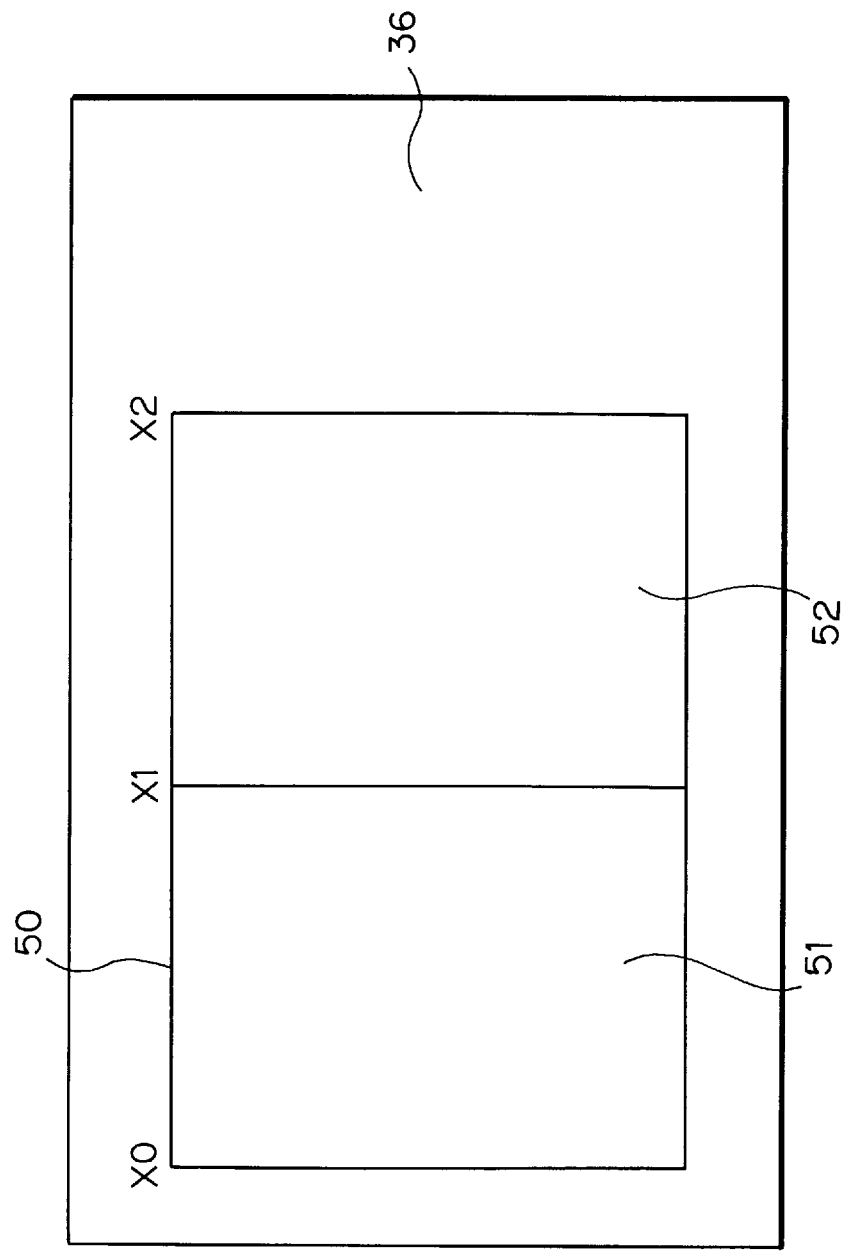

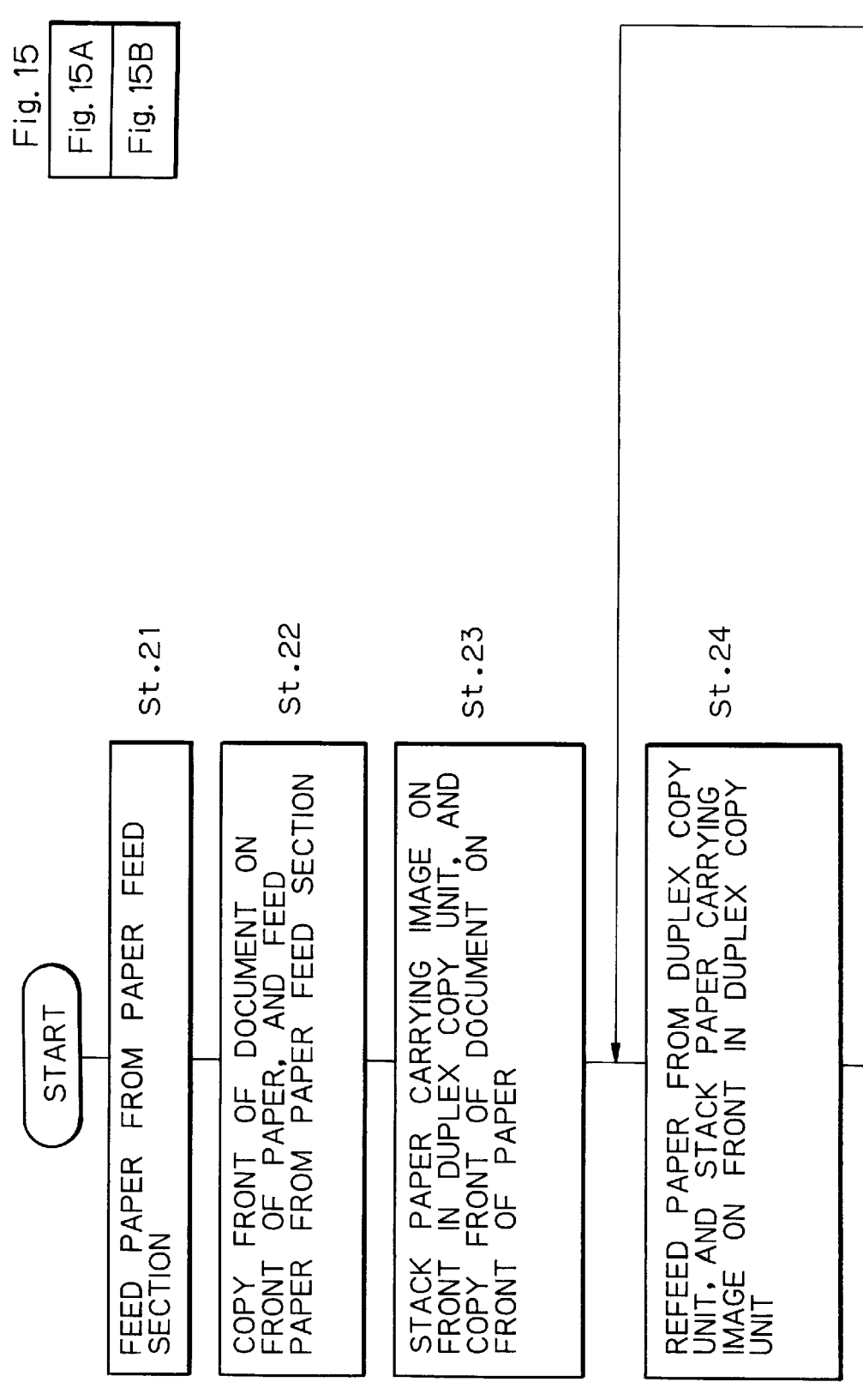

COPIER

BACKGROUND OF THE INVENTION

The present invention relates to an image forming apparatus and, more particularly, to a copier for reading the image of a document and reproducing it on a paper or similar recording medium.

Today, a predominant type of copier has a duplex copy unit for turning over a recording medium, e.g., paper carrying a reproduced image on one side thereof, and refeeding it thereoutof. This type of copier is capable of forming the images of a document or documents on both sides of the paper. It has been customary with this type of copier to repeat the operation for copying a document image on one side of a paper until a desired number of papers have been stacked on the duplex copy unit, and then repeat the operation for copying another document image on the other side of the paper the same number of times as the above operation. Such a procedure is practicable only if the duplex copy unit is capable of stacking a number of papers thereon.

However, some inexpensive duplex copy units cannot stack two or more papers thereon. With a duplex copy unit lacking the above capability, it is a common practice to copy the images of documents on both sides of a single paper and then repeat such an operation with a desired number of papers. This is undesirable from the efficiency standpoint. Specifically, when the operation for copying document images on both sides of a single paper is simply repeated, the number of papers existing in the copier is one or less at all times. This increases the apparent interval between the consecutive papers and therefore the period of time necessary for document images to be reproduced on both sides of a plurality of papers.

SUMMARY OF THE INVENTION

It is therefore an object of the present invention to provide a copier having a duplex copy unit unable to stack a plurality of papers thereon, but capable of enhancing productivity by reducing the period of time necessary for document images to be reproduced on both sides of a plurality of papers.

In accordance with the present invention, a copier has an image reading device for reading a first document and a second document. A feeding device feeds recording media one at a time. An image forming section forms an image on the recording medium on the basis of an image read by the image reading device. A duplex copy unit turns over the recording medium carrying the image formed by the image forming section on one side, and refeeds the recording medium to the image forming section;. An image read controller controls the image reading device such that the image reading device reads the first document, then reads the first document and second document alternately, and finally reads the second document. A feed controller controls the feeding device and duplex copy unit such that one recording medium is fed from the feeding device, then the recording media are alternately fed from the feeding device and duplex copy unit one at a time, and finally one recording medium is fed from the duplex copy unit.

Also, in accordance with the present invention, a copier has an image reading device for reading a first half and a second half of a single document. A feeding device feeds recording media one at a time;. An image forming section forms an image on the recording medium on the basis of an image read by the image reading device. A duplex copy unit turns over the recording medium carrying the image formed by the image forming section on one side, and refeeds the recording medium to the image forming section. An image read controller controls the image reading device such that the image reading device reads the first half of the document, then reads the first half and second half alternately, and finally reads the second half. A feed controller controls the feeding device and duplex copy unit such that one recording medium is fed from the feeding device, then the recording media are alternately fed from the feeding device and duplex copy unit one at a time, and finally one recording medium is fed from the duplex copy unit.

Further, in accordance with the present invention, a copier has an image reading device for reading a document. A document turning device turnds over the document. A feeding device feeds recording media one at a time. An image forming section forms an image on the recording medium on the basis of an image read by the image reading device. A duplex copy unit turns over the recording medium carrying the image formed by the image forming section on one side, and refeeds the recording medium to the image forming section. An image read controller controls the document turning device and image reading device such that the image reading device reads one side of the document, then reads the one side and the other side alternately, and finally reads the other side. A feed controller controls the feeding device and duplex copy unit such that one recording medium is fed from the feeding device, then the recording media are alternately fed from the feeding device and duplex copy unit one at a time, and finally one recording medium is fed from the duplex copy unit.

BRIEF DESCRIPTION OF THE DRAWINGS

The above and other objects, features and advantages of the present invention will become apparent from the following detailed description taken with the accompanying drawings in which:

FIG. 13 is a flowchart representative of another embodiment of the present invention;

FIG. 14 shows a document laid on the glass platen and dealt with by the embodiment of FIG. 13;

DESCRIPTION OF THE PREFERRED EMBODIMENTS

Figure 1B:
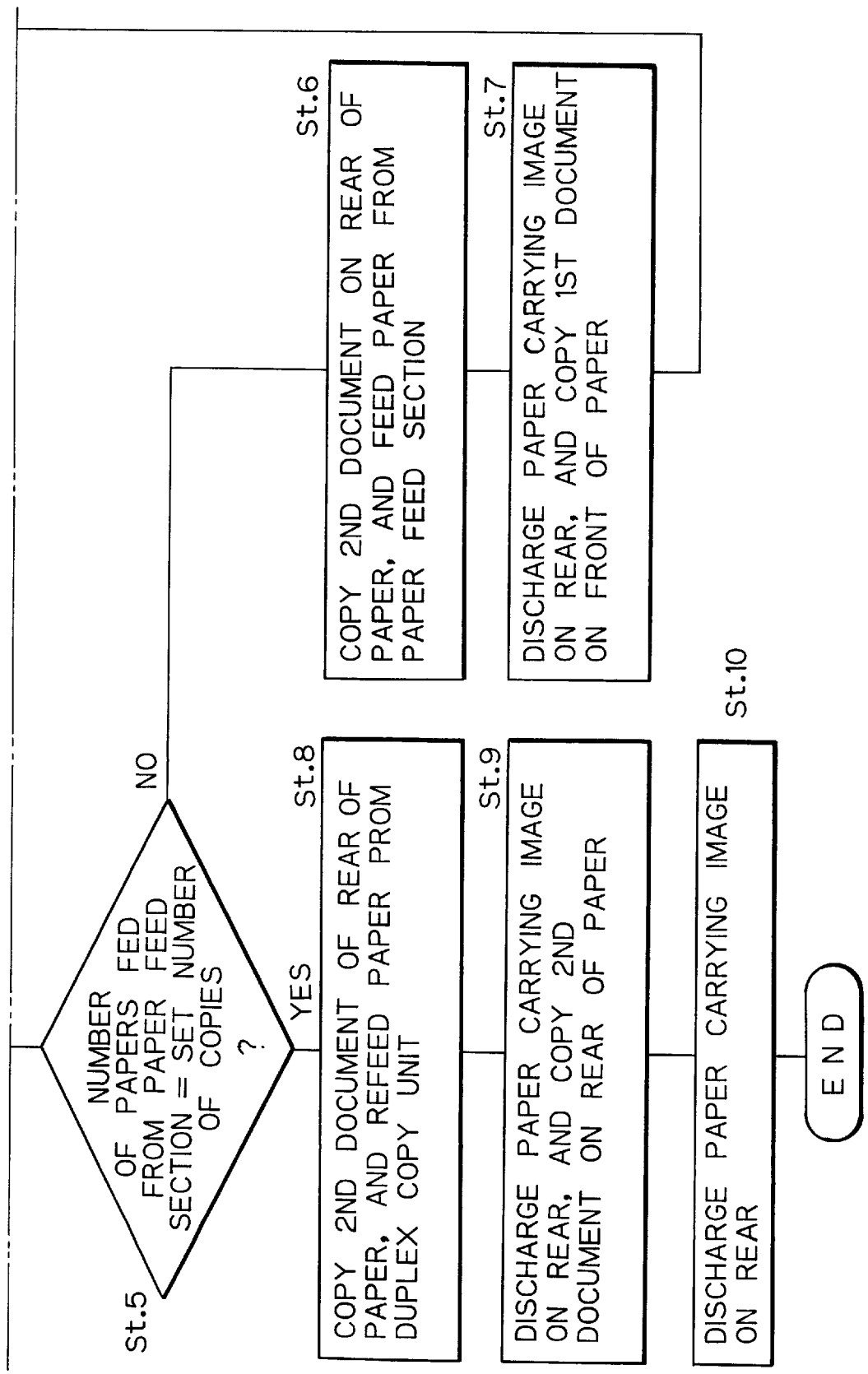
FIG. 1 is a flowchart demonstrating a specific operation of a copier embodying the present invention.
Figure 2:
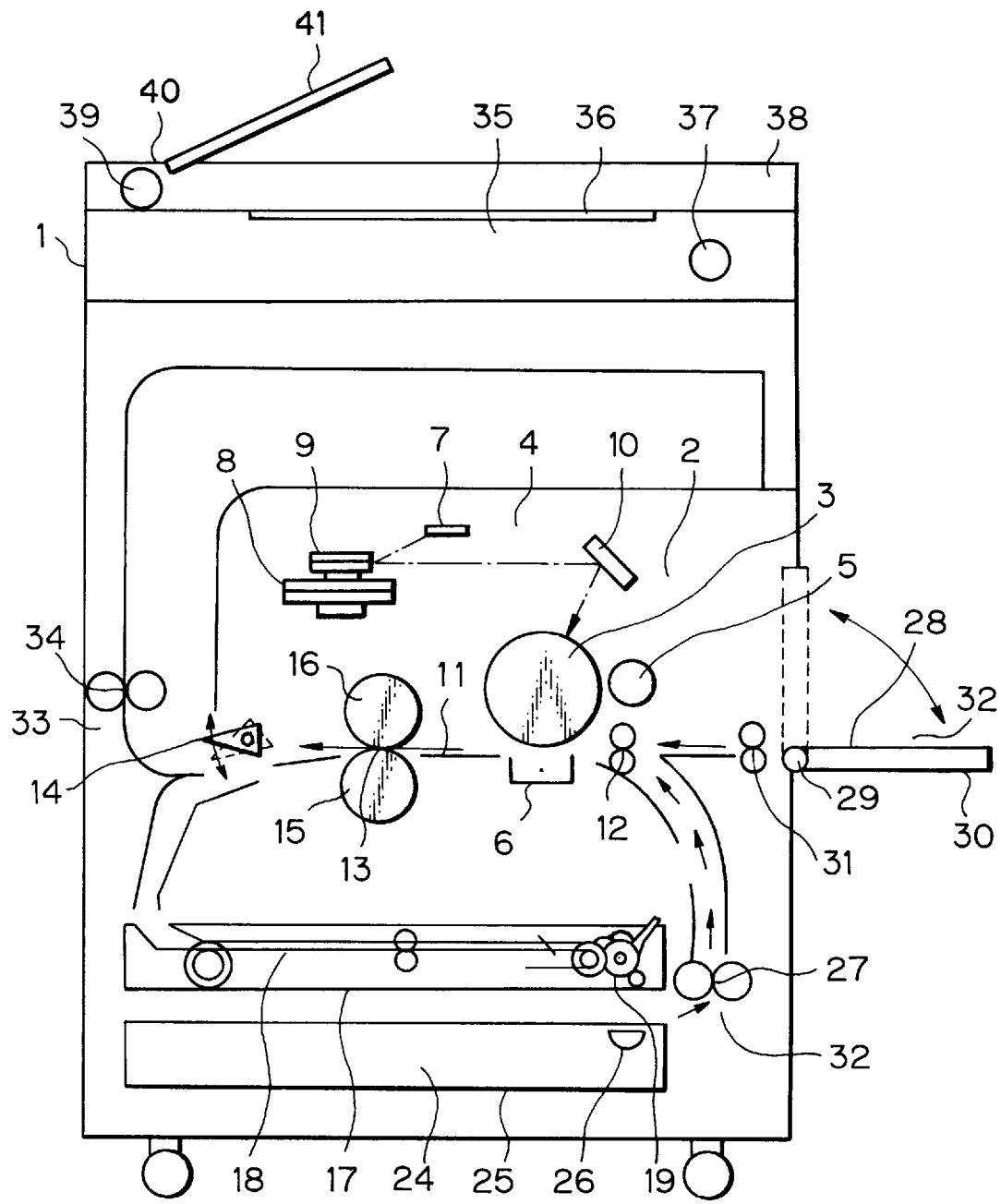
FIG. 2 is a sectional front view of the embodiment.

Referring to FIGS. 1 through 11, a copier embodying the present invention will be described. As shown in FIG. 2, the copier, generally 1, is implemented as a digital copier and has an image forming section 2 at the center thereof. The image forming section 2 has a photoconductive drum 3 at the center thereof. A deflection scanning type exposing unit 4, a developing unit 5 and an image transfer unit 6 are sequentially arranged around the drum 3 in the direction of rotation of the drum 3 (clockwise as viewed in FIG. 2). The exposing unit 4 includes a laser diode (LD) 7, a polygonal mirror 9 driven by a motor 8, and a mirror 10. A transport path 11 is formed below the drum 3 and extends through a gap between the drum 3 and the image transfer unit 6. A registration roller pair 12, the image transfer unit 6, a fixing unit 13 and a switchable guide or path selector 14 are sequentially arranged along the transport path 11 from the upstream side toward the downstream side (from the right to the left as viewed in FIG. 2). The fixing unit 13 has a heat roller 15 and a press roller 16.

Figure 3:
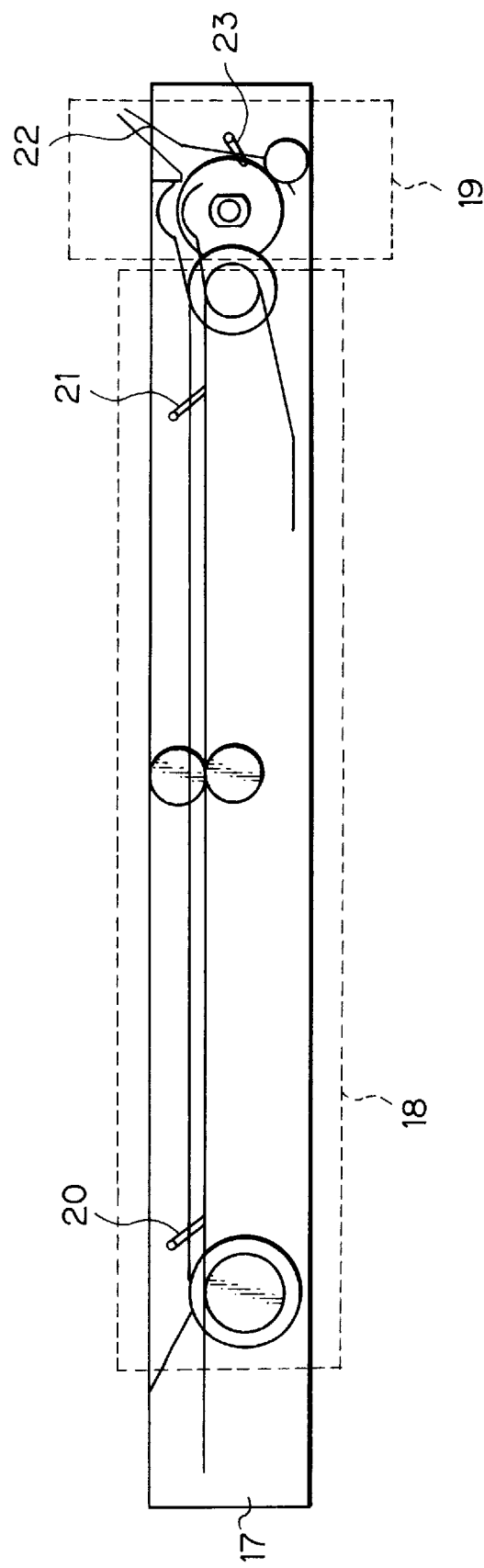
FIG. 3 is a sectional front view of a duplex copy unit included in the embodiment.

A duplex copy unit 17 is positioned below the image forming section 2. The duplex copy unit 17 has a conveying section 18 and a turning section 19. The conveying section 18 extends from below the guide 14 to below the registration roller pair 12. The turning section 19 is located below the roller pair 12 (at the right-hand side as viewed in FIG. 2). As shown in FIG. 3, the conveying section 18 includes a first sensor 20 and a second sensor 21 respectively adjoining the path selector 14 and turning section 19. The turning section 19 includes a paper guide 22 extending to a position upstream of the registration roller pair 12. A third sensor 23 is positioned below the paper guide 22. Further, the conveying section 18 and turning section 19 are each provided with an exclusive stepping motor.

As shown in FIG. 2, a first paper feed section 24 is disposed below the duplex copy unit 17. The paper feed section 24 has a paper cassette 25 capable of being pulled out of the section 24, a pick-up roller 26, and a conveyor roller 27. A second paper feed section 28 is provided on one side of the copier 1 adjacent to the registration roller pair 12. The second paper feed section 28 has a door 30 rotatable about a shaft 29 between a closed position and an open position, and a pick-up roller 31. The two paper feed sections 24 and 28 constitute a paper feed device 32. It is to be noted that papers are a specific form of recording media applicable to the present invention.

A paper outlet section 33 is positioned downstream of the path selector 14 and includes a copy tray, not shown, and an outlet roller pair 34.

An image reading device or scanner 35 is positioned above the image forming section 35. The scanner 35 has a glass platen 36 on its top. Optics, not shown, driven by a scanner motor 37 and a CCD (Charge Coupled Device) line image sensor or similar solid-state imaging device, not shown, are disposed below the glass platen 36. The above optics includes a lamp, mirrors and a lens, although not shown in FIG. 2.

A cover plate 38 is openably mounted on the scanner 35. An automatic document feeder (ADF) is mounted on the cover plate 38 and driven by an ADF motor 39. A document tray 41 is affixed to the ADF 40. The ADF 40 has a function of laying two documents on the glass platen 36 side by side, and a function of turning over documents.

Figure 4:
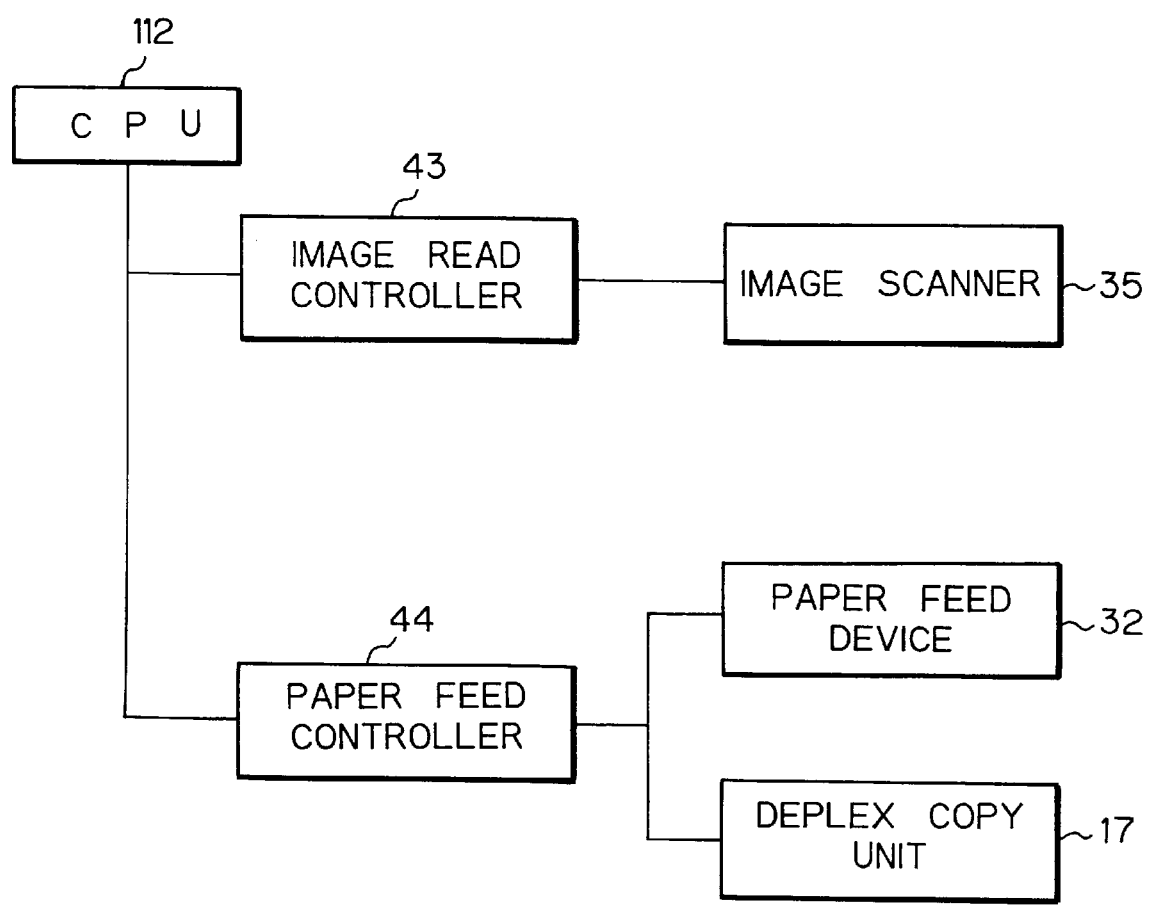
FIG. 4 is a block diagram schematically showing a part of circuitry included in the embodiment.

As shown in FIG. 4, a CPU (Central Processing Unit) 42 is included in the copier 1. Connected to the CPU 42 are an image read controller or control means 43 for controlling the scanner 35, and a paper feed controller or control means 44 for controlling the paper feed device 32 and duplex copy unit 17.

An image processing section, not shown, is connected to the scanner 35 on the one hand and connected to the LD 7 on the other hand.

Figure 5:
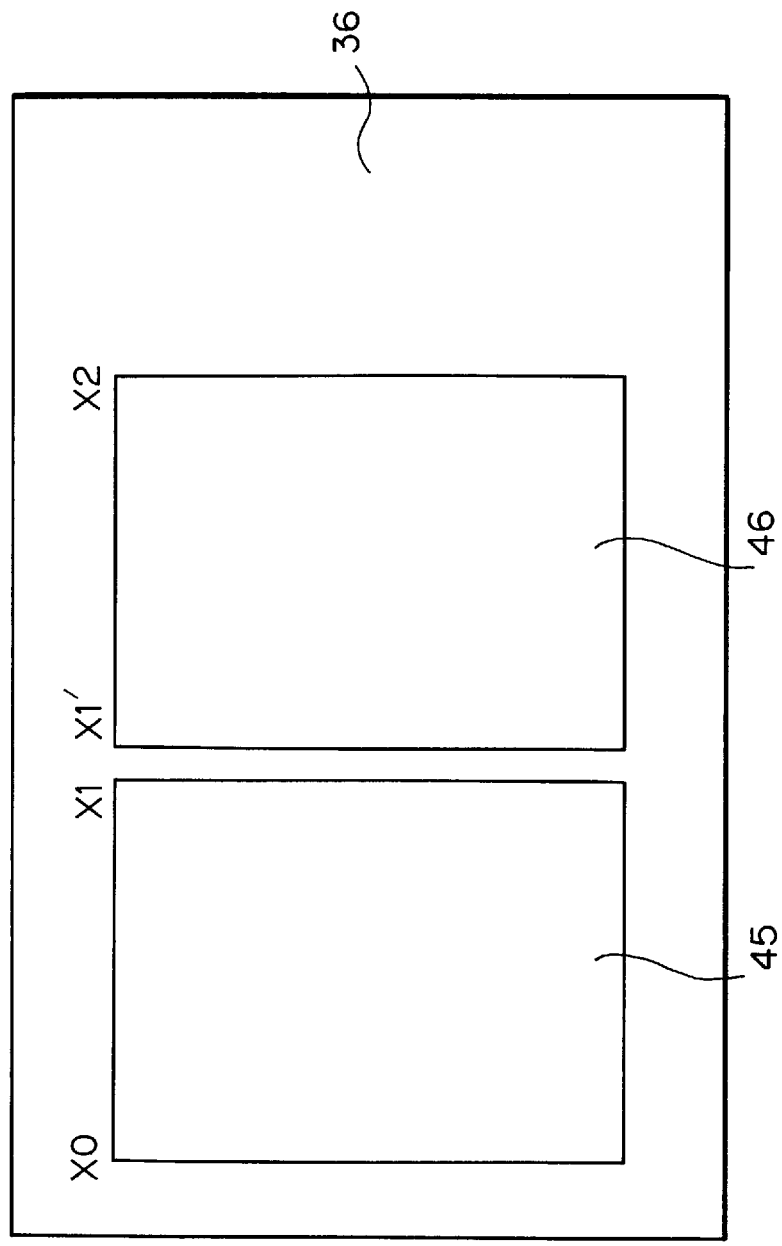
FIG. 5 is a plan view showing documents laid on a glass platen included in the embodiment.
Figure 6:
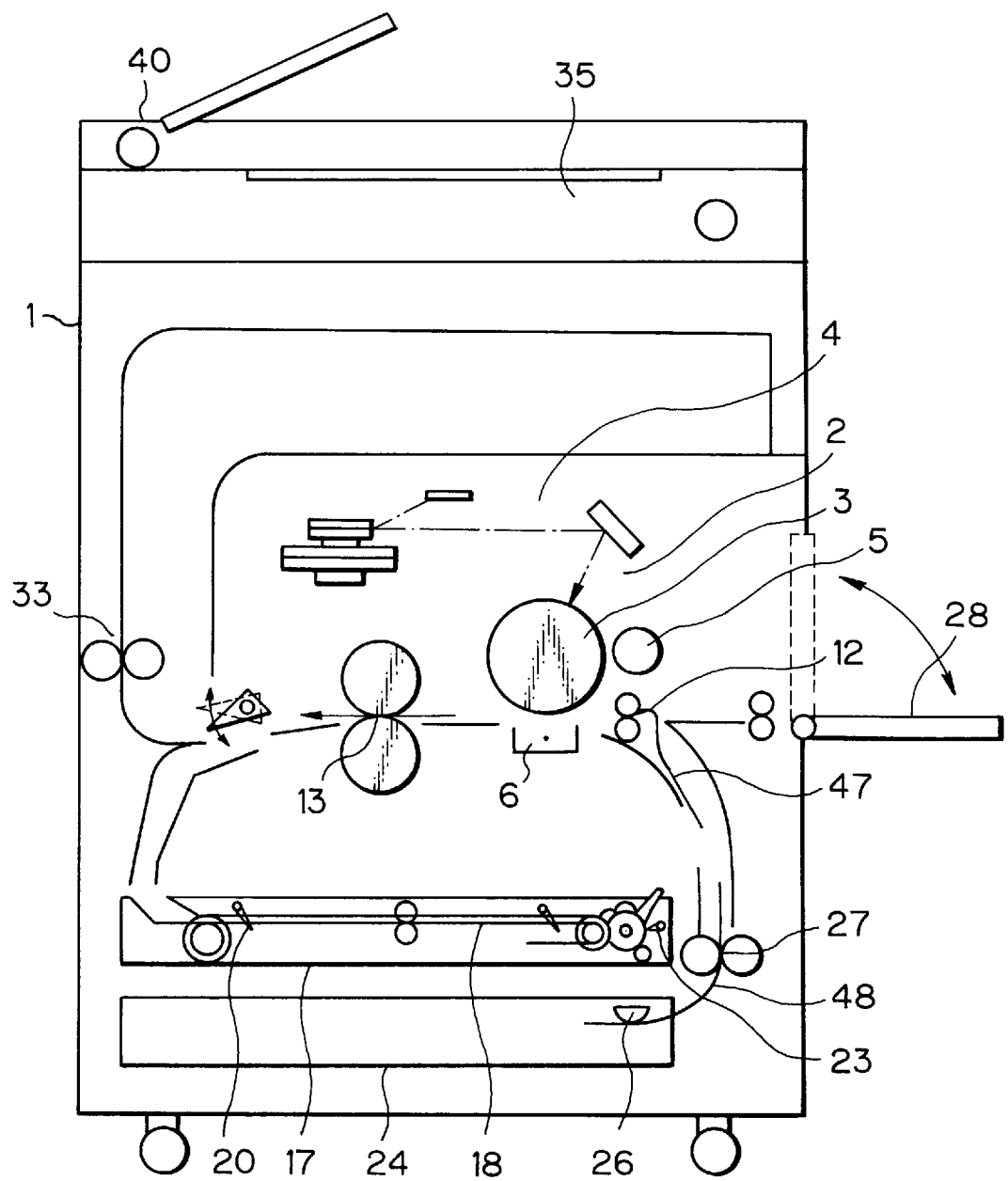
FIGS. 6 through 12 are sectional front views showing how papers are conveyed in the embodiment.

A reference will be made to FIG. 1 for describing how the embodiment reproduces the images of two documents on both sides of a number of papers. First, the operator sets the first document 45 and second document 46 on the document tray 41, operates keys arranged on an operation panel, not shown, to input a desired number of copies N (2 or greater integer) and other copy data, and then presses a start key, not shown. In response, the ADF 40 feeds the documents 45 and 46 one by one and sets them on the glass platen 36 side by side, as shown in FIG. 5. As shown in FIG. 6, the first paper 47 is fed from the first feed section 24 by the pick-up roller 26 and conveyor roller 27 (step St. 1).

Figure 7:
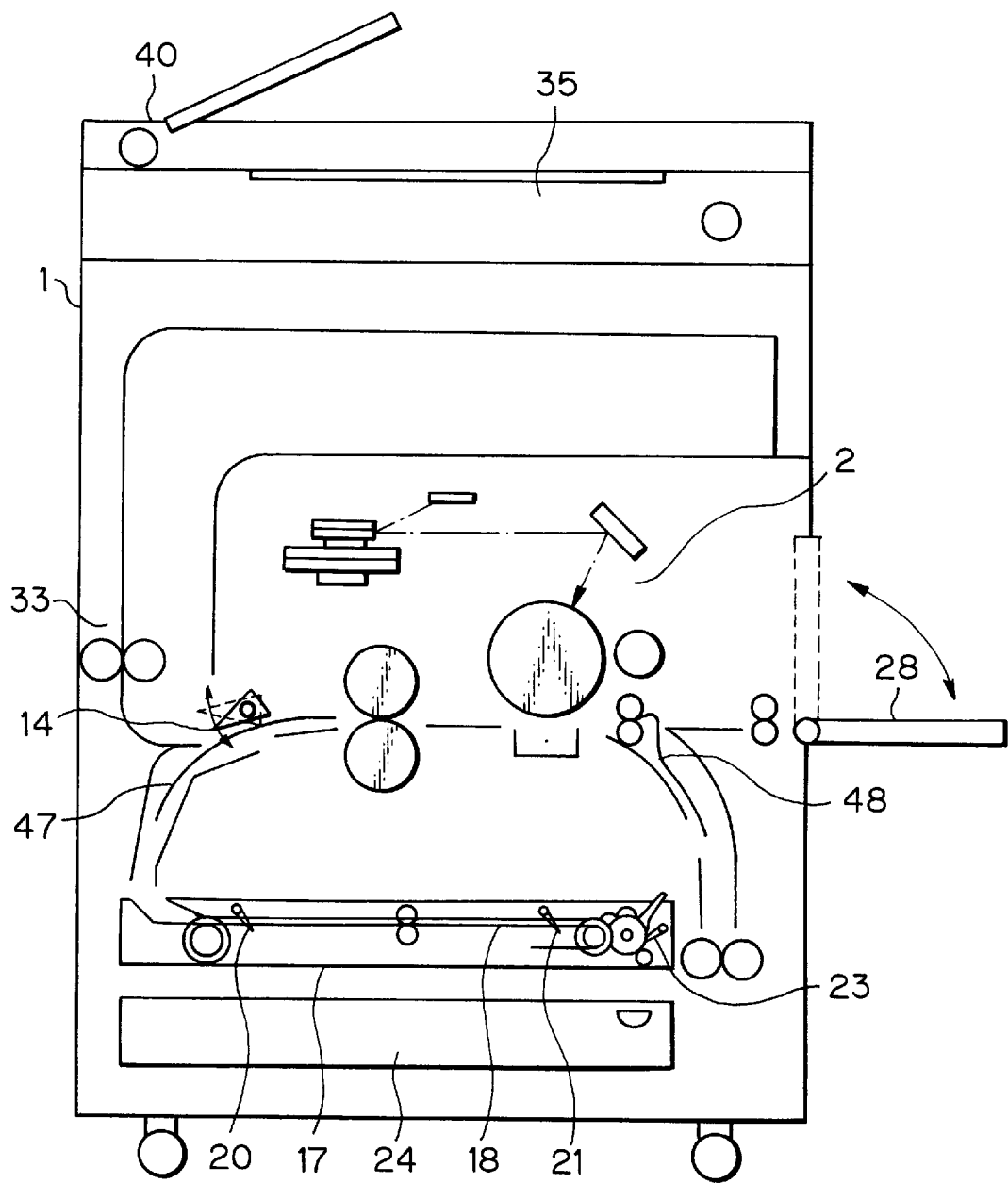

The registration roller pair 12 stops the first paper 47 and again drives it after causing it to bend a sufficient amount. The scanner 35 starts scanning the first document 45 at such a timing that the leading edge of the first paper 47 meets the leading edge of an image to be formed on the drum 3. Specifically, the lamp 45 illuminates the document 45 while the resulting reflection is input to the solid-state imaging device via the mirrors and lens, as stated earlier. The imaging device transforms the incident light to an electric signal representative of image data. The image processing section executes preselected image processing with the image data. The exposing unit 4 electrostatically forms a latent image on the drum 3 on the basis of the processed image data. The developing unit 5 develops the latent image with toner to thereby produce a corresponding toner image. The registration roller pair 12 starts driving the first paper 47 such that the leading edge of the paper 47 meets the leading edge of the toner image. The image transfer unit 6 transfers the toner image from the drum 3 to one side or front of the paper 47. A paper separating and conveying section, not shown, separates the paper 47 carrying the toner image thereon from the drum 3 and conveys it to the fixing unit 13. The fixing unit 13 fixes the toner image on the paper 47 by heat and pressure. At this instant, as shown in FIG. 7, the second paper 48 is fed from the paper feed section 24 (step St. 2).

Figure 8:
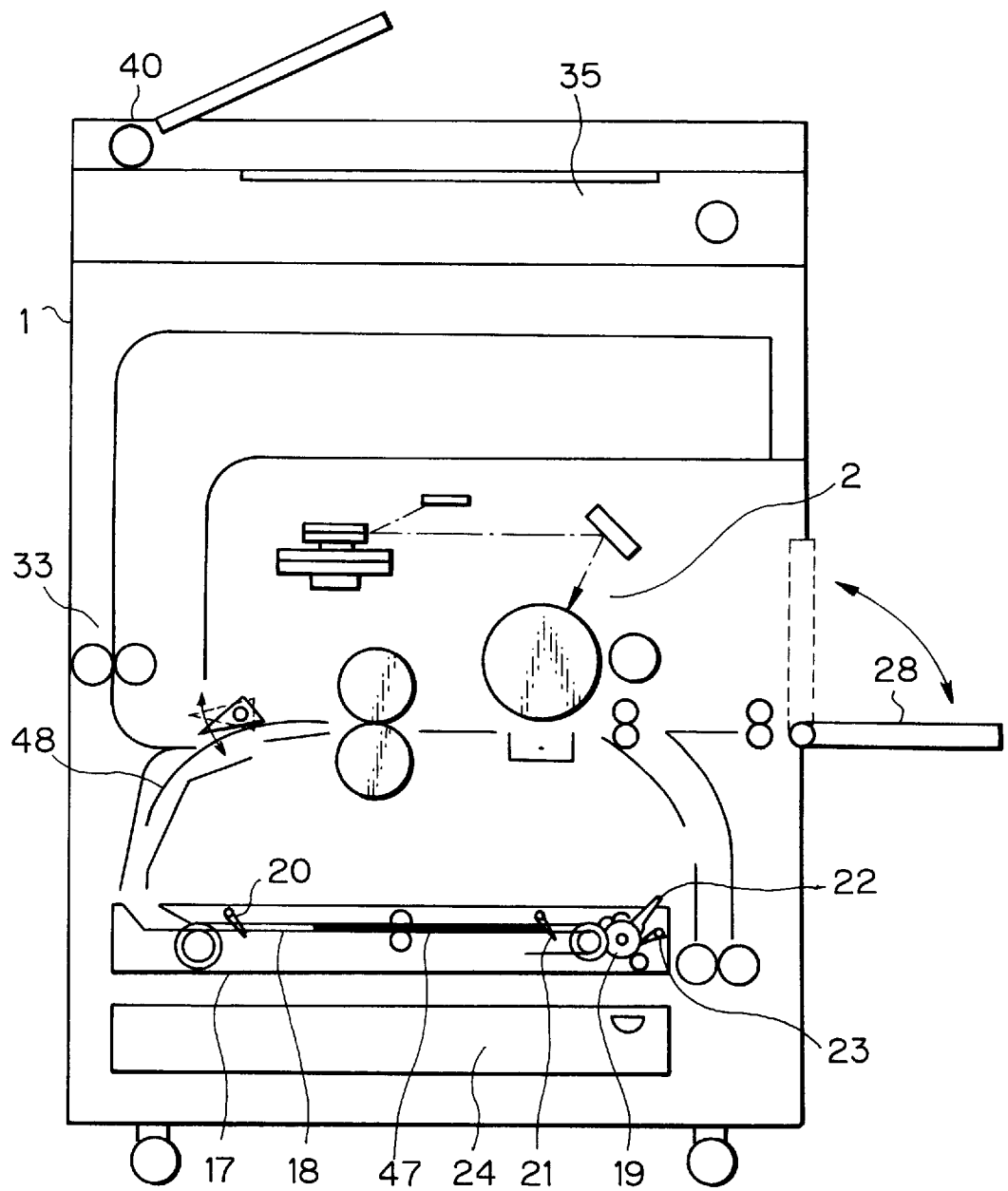

The first paper 47 with the toner image transferred thereto in the step St. 2 is steered by the switchable guide 14 to the duplex copy unit 17. The conveying section 18 conveys the paper 47 by way of the first sensor 20 and second sensor 21. As shown in FIG. 8, when the second sensor 21 has sensed the paper 47, whether or not the third sensor 23 has sensed a paper is determined. If the third sensor 23 has sensed a paper 47, the stepping motor assigned to the conveying section 18 is deenergized in order to stack the paper 47 in the conveying section 18. However, if the sensor 23 has not sensed a paper, the conveying section 18 and turning section 19 convey the paper 47 to the turning section 19. In this case, because no papers exist in the turning section 19, the paper 47 is directly conveyed to the turning section 19 without being stacked. As soon as the trailing edge of the paper 47 reaches a position below the guide 22, the stepping motor assigned to the turning section 19 is turned off in order to stack the paper 47 in the turning section 19. At this instant, the scanner 35 again reads the first document 45 with the result that the image of the document 45 is reproduced on the front of the second paper 48 (step St. 3).

Figure 9:
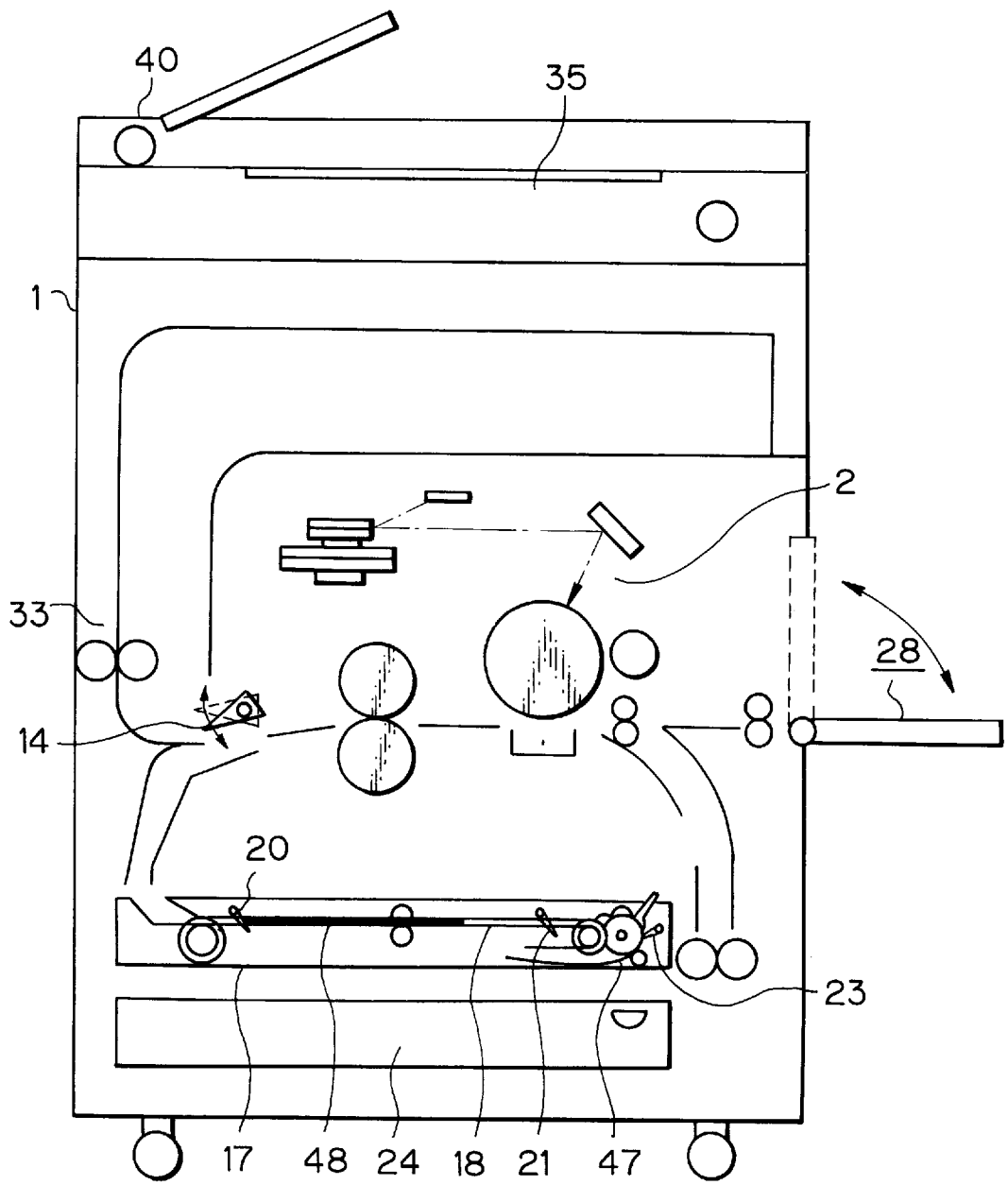
Figure 10:
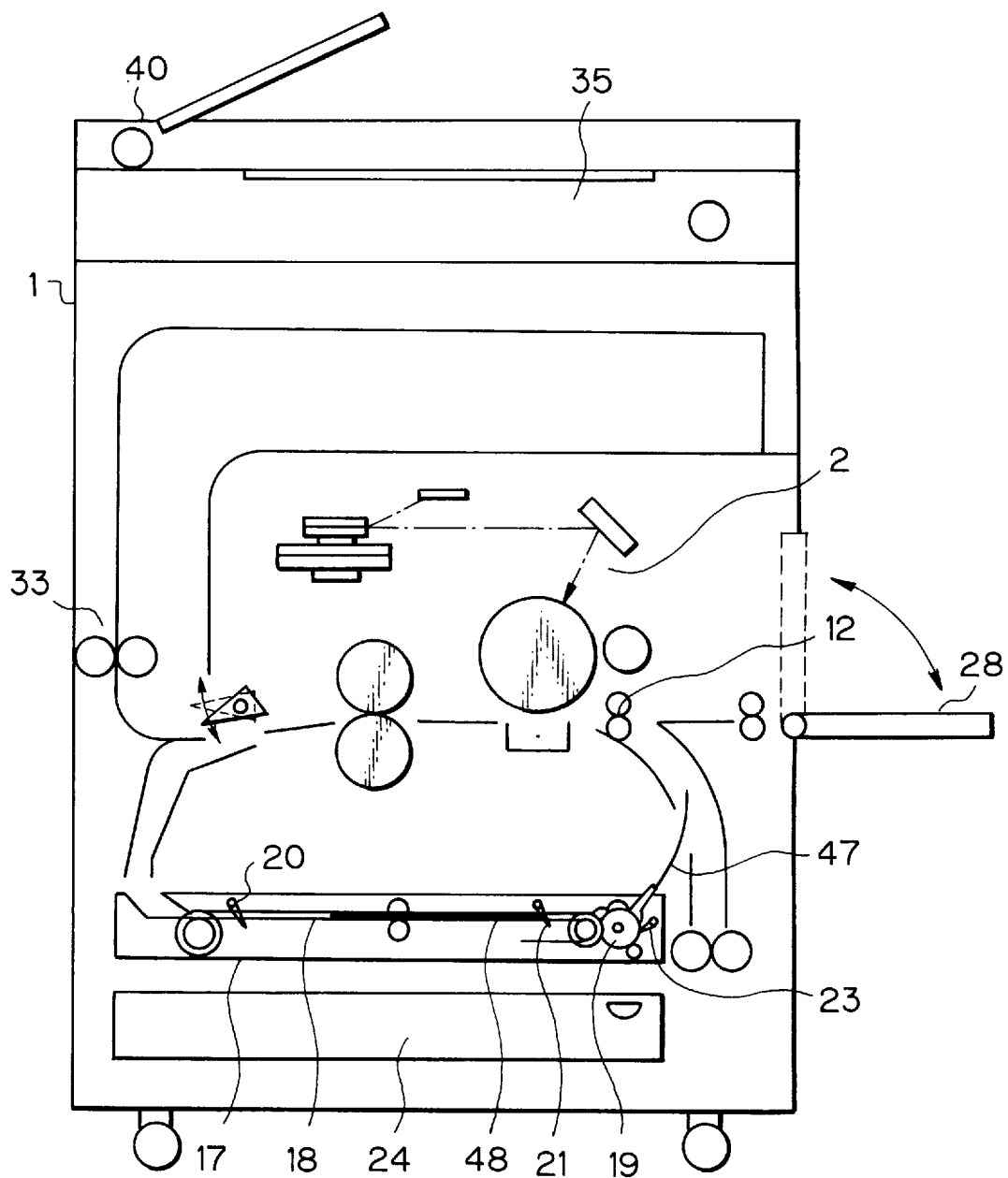
Figure 11:
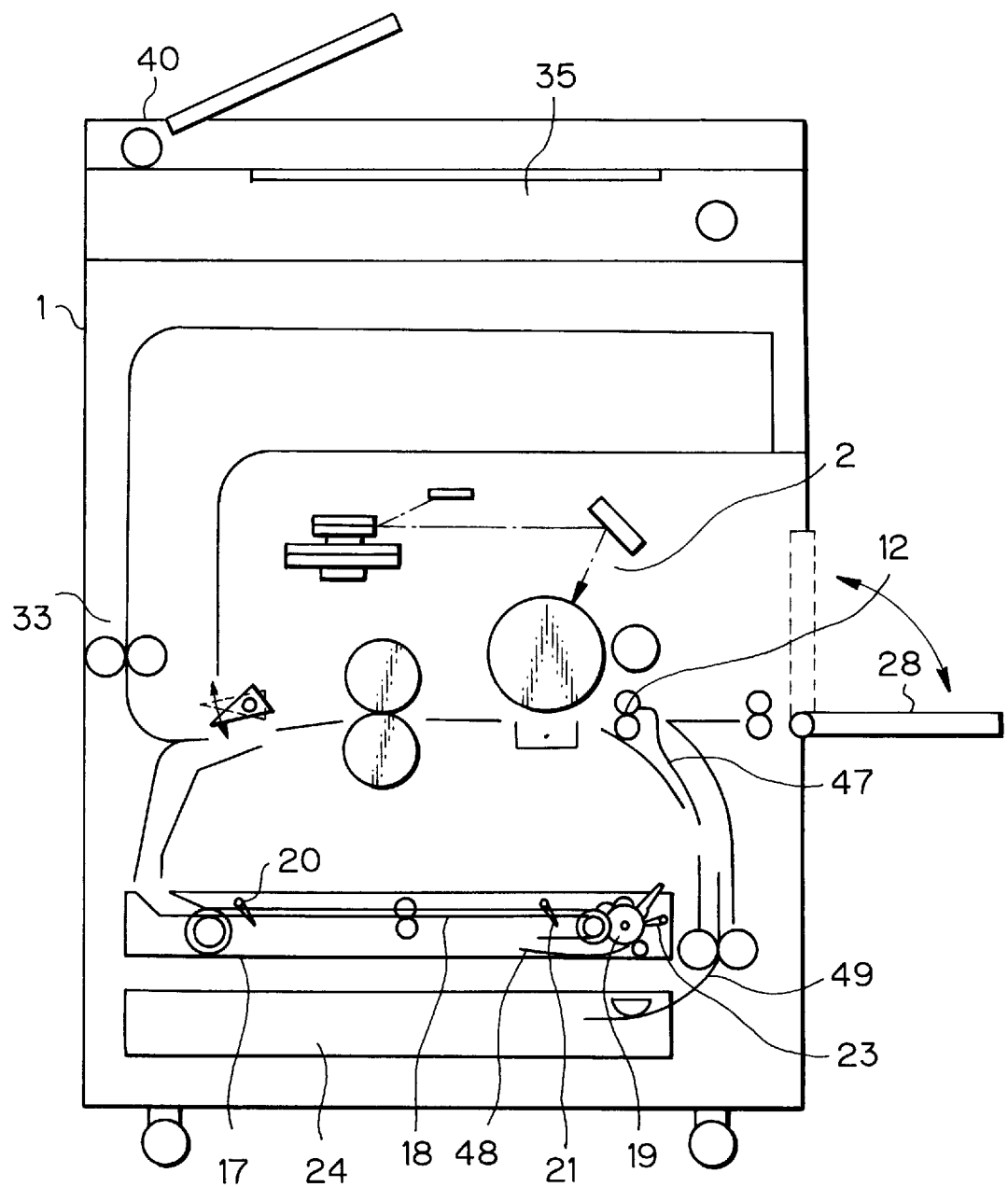

As shown in FIG. 9, the second paper 48 carrying the image on its front is also steered by the path selector 14 to the duplex copy unit 17. The conveying section 18 conveys the paper 48 by way of the first and second sensors 20 and 21. When the sensor 21 has sensed the paper 48, whether or not the third sensor 23 has sensed the first paper 47 is determined. In this case, because the first paper 47 exists in the turning section 19, the second paper 48 is stacked in the conveying section 18. Subsequently, as shown in FIGS. 10 and 11, the stepping motor of the turning section 19 is rotated in the reverse direction to drive the first paper 47 out of the duplex copy unit 1, i.e., to refeed the first paper 47. When the first paper 47 is entirely driven out of the turning section 19, the second paper 48 is introduced into the turning section 19 and stacked therein (step St. 4).

Figure 12:
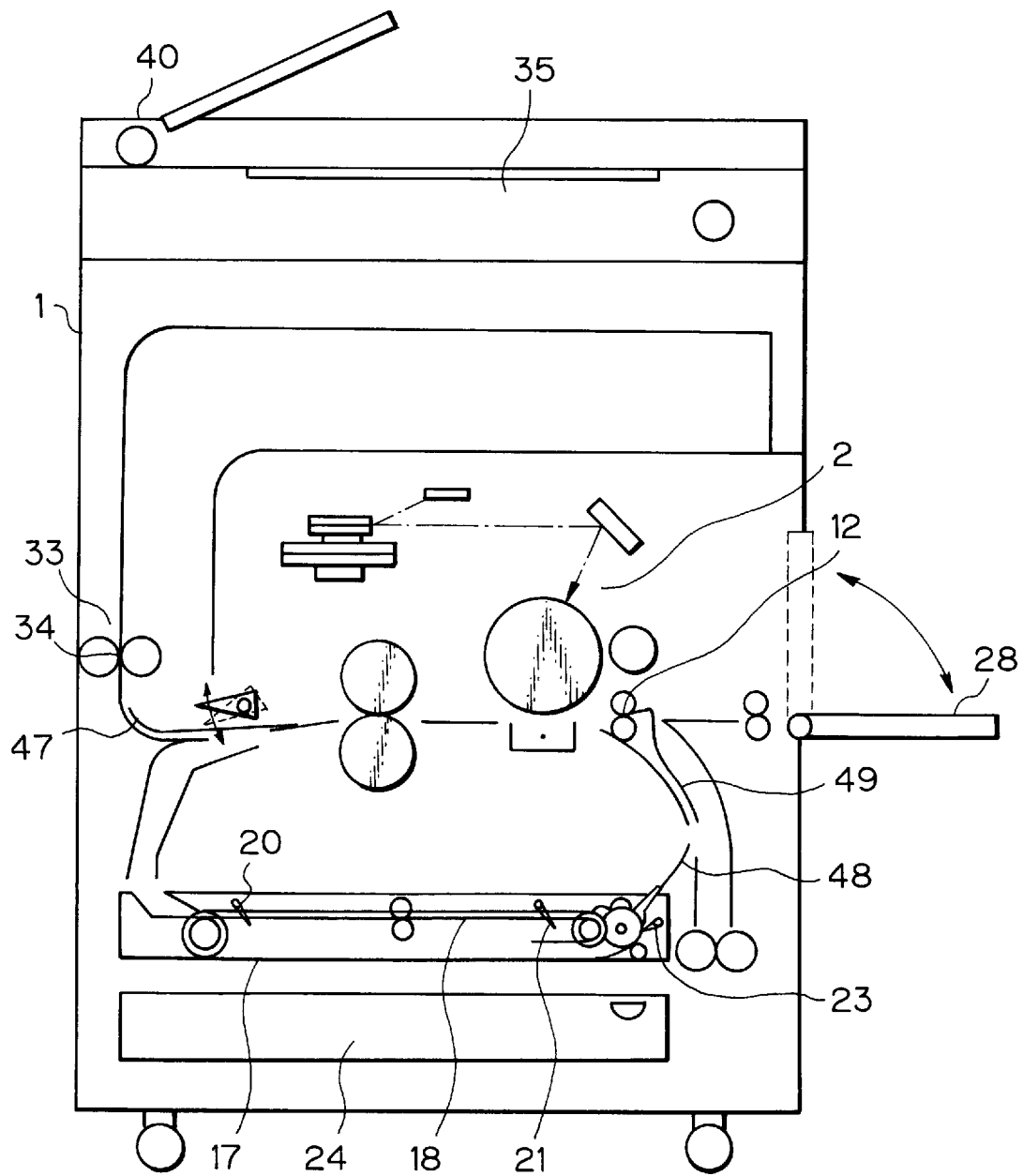

Whether or not the N-th paper has been fed from the paper feed section 24 is determined (step St. 5). If the N-th paper has not been fed from the paper feed section 24 yet (NO, step St. 5), the first paper 47 is again conveyed to the registration roller pair 12. Then, the optics of the scanner 35 is brought to a position for starting reading the second document 46 (position X1' in FIG. 5). As a result, the image of the second document 46 is reproduced on the other side or rear of the first paper 47. As shown in FIG. 12, after the scanner 35 has read the second document 46, the third paper 49 is fed from the paper feed section 24 such that it reaches the registration roller pair 12 when the optics of the scanner 35 is brought to a position for starting reading the first document 45 (position X0 in FIG. 5) (step St. 6).

The first paper 47 carrying the images of the documents 45 and 46 on its front and rear, respectively, is steered by the path selector 14 to the paper outlet section 33 and then driven out of the copier by the outlet roller pair 34. At this instant, the image of the first document 45 is reproduced on the front of the third paper 49 (step St. 7). The third paper 49 carrying the image on its front is conveyed to the duplex copy unit 17. Subsequently, the steps St. 4 to St. 7 are repeated. Every time the step St. 6 is repeated, the fourth paper, fifth paper, sixth paper, . . . , (N–1)-th paper and N-th paper are fed from the paper feed section 24 one by one. Every time the step St. 4 is repeated, the papers are each refed from the duplex copy unit 17 such that it reaches the registration roller pair 12 when the optics of the scanner 35 is brought to the position X1' for starting reading the second document 46. Further, every time the step St. 6 is repeated, each paper is fed from the paper feed section 24 such that it reaches the registration roller 12 when the above optics is brought to the position X0 for starting reading the first document 45.

When the N-th paper is fed from the first paper feed section 24 (YES, step S5), the scanner 35 reads the second document 46. As a result, the image of the document 46 is reproduced on the rear of the (N–1)-th paper fed from the duplex copy unit 17. The N-th paper is refed from the duplex copy unit 17 such that it reaches the registration roller pair 12 when the optics of the scanner 35 is again brought to the position X1' for starting reaching the second document 46 (step St. 8). After the images of the two documents 45 and 46 have been formed on both sides of the (N–1)-th paper in the step St. 8, the (N–1)-th paper is steered by the path selector 14 to the paper outlet section 33 and then driven out of the copier by the outlet roller pair 34. At this instant, the scanner 35 reads the second document 46 with the result that the image of the second document 46 is reproduced on the rear of the N-th paper (step St. 9). The N-th paper carrying the images of the documents 45 and 46 on both sides thereof is also steered by the path selector 14 to the paper outlet section 33 and then driven out by the outlet roller pair 34 (step St. 10).

As stated above, after the image of the first document 45 has been reproduced on the front of the first paper 47, the paper 47 is stacked in the duplex copy unit 17. Thereafter, the papers are alternately fed from the paper feed section 24 and duplex copy unit 17 one at a time. As a result, the images of the first and second documents 45 and 46 are formed on both sides of the N papers. Specifically, the read control section 43 so controls the scanner 35 as to sequentially read the first document 45, first document 45, second document 46, first document 45, second document 46, first document 45, . . . , first document 45, second document 46, and second document 46 in this order. At the same time, the paper feed controller 44 so controls the paper feed device 32 as to sequentially feed the first paper carrying no images, second paper carrying no images, first paper carrying an image on its front, third paper carrying no images, second paper carrying an image on its front, fourth paper carrying no images, . . . , N-th paper carrying no images, (N–1)-th paper carrying an image on its front, and N-th paper carrying an image on its front in this order. As a result, the image forming section 2 sequentially reproduces the documents 45 and 46 on the front of the first paper, the front of the second paper, the rear of the first paper, the front of the third paper, the rear of the second paper, the front of the fourth paper, . . . , the front of the N-th paper, the rear of the (N–1)-th paper, and the rear of the N-th paper. Such a procedure reduces the apparent interval between the consecutive papers without resorting to a memory, thereby reducing the overall copying time. This successfully enhances productivity despite that the duplex copy unit 17 has a simple and inexpensive configuration.

While the above embodiment has concentrated on two documents stacked on the tray 41, any other desired number of documents may be stacked. For example, assume that M documents are stacked on the tray 41. Then, two of the M documents will be fed to the glass platen 36 at a time and set thereon side by side. This will be followed by the above-described procedure in order to reproduce the M documents on both sides of a number of copies. Of course, not the ADF 40 but the operator may lay the first and second documents 45 and 46 on the glass platen by hand.

In the illustrative embodiment, the two documents 45 and 46 are reproduced on both sides of N papers. Alternatively, assume that use is made of a copier having a memory for storing the images of documents read by a scanner. Then, the third and successive documents following the first and second documents 45 and 46 may be reproduced on both sides of N papers. In such a case, if the answer of the step St. 5, FIG. 1, is positive (YES), then the first paper for reproducing the third and fourth documents on both sides thereof is fed from the paper feed section 24 when the second document 46 is reproduced on the rear of the (N–1)-th paper in the step St. 8. When the (N–1)-th paper is driven out of the copier, the third document is reproduced on the front of the above first paper. When the N-th paper is refed from the duplex copy unit 17, the first paper is stacked on the turning section 19. Subsequently, when the second document 46 is reproduced on the rear of the N-th paper, the second paper for reproducing the third and fourth documents on both sides thereof is fed from the paper feed section 24. When the N-th paper is driven out of the copier, the first paper is refed from the duplex copy unit. This is followed by the previously stated steps St. 4 through St. 10 in order to reproduce the third and fourth documents on both sides of the N papers. The above procedure may be repeated with the fifth and successive documents.

Referring to FIGS. 13 and 14, an alternative embodiment of the present invention will be described. In this embodiment, as well as a further embodiment to follow, the same or similar constituents as or to the constituents of the previous embodiment are designated by like reference numerals, and a detailed description thereof will not be made in order avoid redundancy.

FIG. 13 demonstrates a procedure for dividing a single document or spread document into two and reproducing the halved images on both sides of a number of papers. First, the operator sets a single document 50 on the document tray 41, operates keys arranged on the operation panel, not shown, to input a desired number of copies N (2 or greater integer) and other copy data, and then presses the start key, not shown. In response, the ADF 40 feeds the document 50 and sets it on the glass platen 36, as shown in FIG. 14. The first paper 47 is fed from the paper feed section 24 (step St. 11).

The scanner 35 reads the first half 51 of the document 50 (from X0 to X1 in FIG. 14) with the result that the first half 51 is reproduced on the front of the first paper 47. At this instant, the second paper 48 is fed from the paper feed section 24 (step St. 12).

After the first half 51 of the document 50 has been reproduced on the front of the first paper 47 in the step St. 12, the paper 47 is steered to the duplex copy unit 17 by the path selector 14 and stacked in the turning section 19. At this instant, the scanner 35 reads the first half 51 of the document 50 so as to reproduce it on the front of the second paper 48 (step St. 13).

The second paper 48 is conveyed to the duplex copy unit 17 via the path selector 14. The conveying section 18 conveys the paper 48 by way of the first and second sensors 20 and 21. Because the first paper 47 exists in the turning section 19, the second paper 48 is stacked in the conveying section 48. Then, the stepping motor 19 of the turning section 19 is driven in the reverse direction for thereby refeeding the first paper 47 from the duplex copy unit 17. When the first paper 47 is fully driven out of the turning section 19, the second paper 48 is conveyed to the turning section 19 and stacked there (step St. 14).

Whether or not the N-th paper has been fed from the paper feed section 24 is determined (step St. 15). If the N-th paper has not been fed from the paper feed section 24 yet (NO, step St. 15), the first paper 47 is again conveyed to the registration roller pair 12 such that its leading edge meets the leading edge of an image to be formed on the drum 3. The optics of the scanner 35 is brought to the position X1 for starting reading the second half 52 of the document 50 (from X1 to X2 in FIG. 14). As a result, the second half 52 is reproduced on the rear of the first paper 47. At this instant, the scanner 35 reads the second half 52 of the document 50. The third paper 49 is fed from the paper feed section 24 such that it reaches the registration roller 12 when the optics of the scanner 35 is shifted to the position X0 for starting reading the first half 51 (step St. 16).

The first paper 47 carrying the images of the two halves 51 and 52 of the document 50 on both sides thereof in the step St. 16 is steered by the path selector 14 to the paper outlet section 33 and then driven out of the copier by the outlet roller pair 34. At this instant, the first half 51 is reproduced on the front of the third paper 49 (step St. 17). The third paper 49 carrying the image on its front is conveyed to the duplex copy unit 17. Subsequently, the steps St. 14 through St. 17 are repeated. Every time the step St. 16 is repeated, the fourth paper, fifth paper, sixth paper, . . . , (N−1)-th paper and N-th paper are fed from the paper feed section 24 one by one. Every time the step St. 14 is repeated, the papers are each refed from the duplex copy unit 17 such that it reaches the registration roller pair 12 when the optics of the scanner 35 is brought to the position X1 for starting reading the second half 52. Further, every time the step St. 16 is repeated, each paper is fed from the paper feed section 24 such that it reaches the registration roller 12 when the above optics is brought to the position X0 for starting reading the first half 51.

When the N-th paper is fed from the paper feed section 24 (YES, step S15), the scanner 35 reads the second half 52. As a result, the second half 52 is reproduced on the rear of the (N−1)-th paper refed from the duplex copy unit 17. The N-th paper is refed from the duplex copy unit 17 such that it reaches the registration roller pair 12 when the optics of the scanner 35 is again brought to the position X1 for starting reading the second half 52 (step St. 18). After the images of the two halves 51 and 52 have been formed on both sides of the (N−1)-th paper in the step St. 18, the (N−1)-th paper is steered by the path selector 14 to the paper outlet section 33 and then driven out of the copier by the outlet roller pair 34. At this instant, the scanner 35 reads the second half 52 with the result that the second half 52 is reproduced on the rear of the N-th paper (step St. 19). The N-th paper carrying the images of the two halves 51 and 52 on both sides thereof is also steered by the path selector 14 to the paper outlet section 33 and then driven out by the outlet roller pair 34 (step St. 20).

As stated above, after the image of the first half 51 has been reproduced on the front of the first paper 47, the paper 47 is stacked in the duplex copy unit 17. Thereafter, the papers are alternately fed from the paper feed section 24 and duplex copy unit 17. As a result, the images of the first and second halves 51 and 52 are formed on both sides of the N papers. Specifically, the read control section 43 so controls the scanner 35 as to sequentially read the first half 51, first half 61, second half 52, first half 51, second half 52, first half 51, . . . , first half 51, second half 52 and second half 52 in this order. At the same time, the paper feed controller 44 so controls the paper feed device 32 as to sequentially feed the first paper carrying no images, second paper carrying no images, first paper carrying an image on its front, third paper carrying no images, second paper carrying an image on its front, fourth paper carrying no images, . . . , N-th paper carrying no images, (N−1)-th paper carrying an image on its front, and N-th paper carrying an image on its front in this order. As a result, the image forming section 2 sequentially reproduces the two halves 51 and 52 on the front of the first paper, the front of the second paper, the rear of the first paper, the front of the third paper, the rear of the second paper, the front of the fourth paper, . . . , the front of the N-th paper, the rear of the (N−1)-th paper, and the rear of the N-th paper. Such a procedure reduces the apparent interval between the consecutive papers without resorting to a memory, thereby reducing the overall copying time. This successfully enhances productivity despite that the duplex copy unit 17 has a simple and inexpensive configuration, as in the previous embodiment.

While the embodiment has concentrated on a single document set on the tray 41, a plurality of documents may be stacked on the tray 41. For example, when M documents are stacked on the tray 41, then they will be fed to and set on the glass platen 36 one by one. This will be followed by the above-described procedure in order to reproduce the two halves of each of M documents on both sides of a number of copies. Of course, not the ADF 40 but the operator may lay the document 50 on the glass platen by hand.

In the illustrative embodiment, a single document 50 is divided into two and has the two halves 51 and 52 reproduced on both sides of N papers. Alternatively, assume that use is made of a copier having a memory for storing the images of documents read by a scanner. Then, the third and fourth halves of another document, the fifth and sixth halves of still another document and so forth following the first and second halves 51 and 52 may be reproduced on both sides of N papers. In such a case, if the answer of the step St. 15 is positive (YES), then the first paper for reproducing the third and fourth halves on both sides thereof is fed from the paper feed section 24 when the second half 52 is reproduced on the rear of the (N-1)-th paper in the step St. 18. When the (N-1)-th paper is driven out of the copier, the third half is reproduced on the front of the above first paper. When the N-th paper is refed from the duplex copy unit 17, the first paper is stacked on the turning section 19. Subsequently, when the second half 52 is reproduced on the rear of the N-th paper, the second paper for reproducing the third and fourth halves on both sides thereof is fed from the paper feed section 24. When the N-th paper is driven out of the copier, the first paper is refed from the duplex copy unit 17. This is followed by the previously stated steps St. 14 to St. 20 in order to reproduce the third and fourth halves on both sides of the N papers. The above procedure may be repeated with the fifth and successive halves.

Figure 15B:
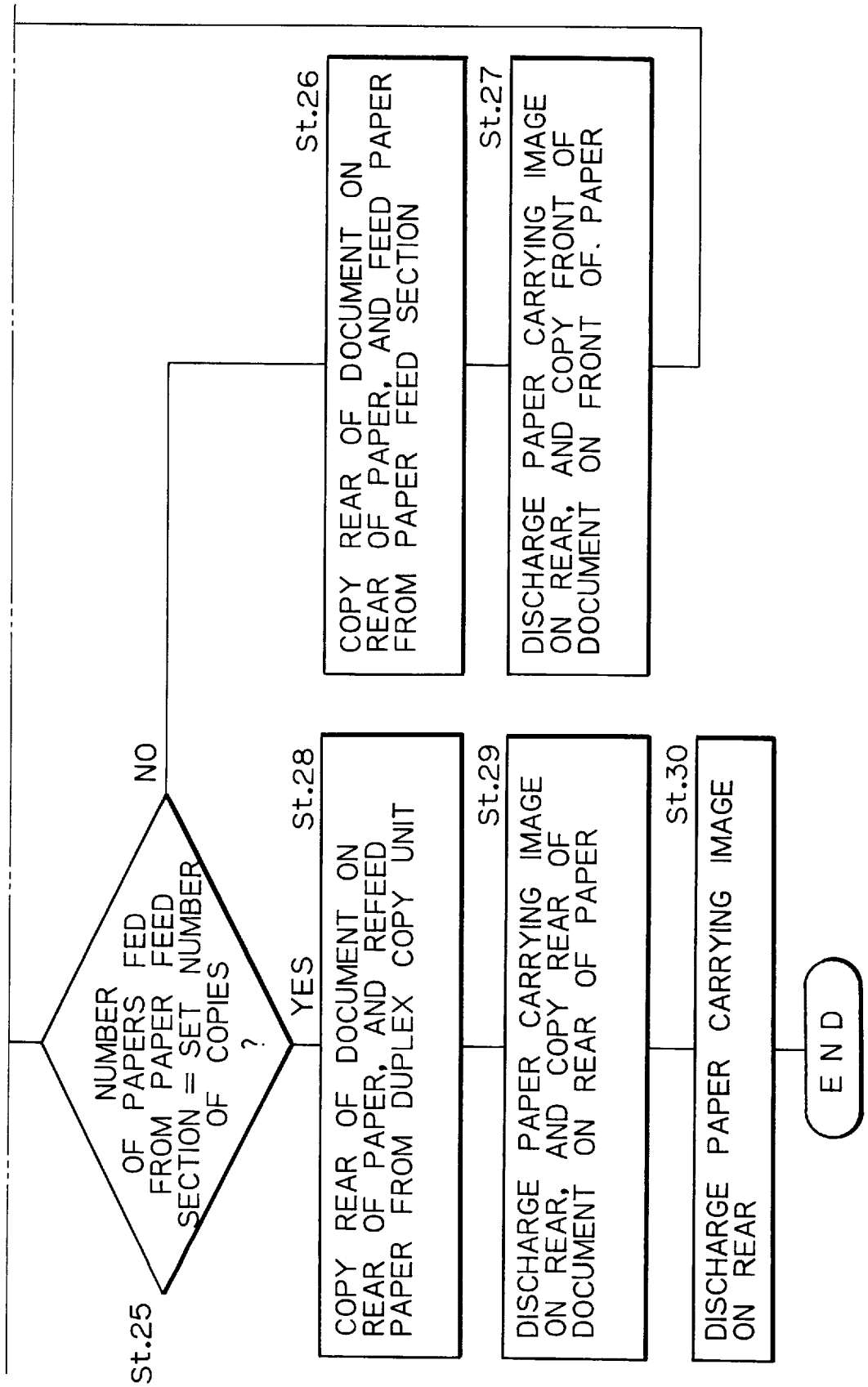
FIG. 15 is a flowchart representative of a further embodiment of the present invention.
Figure 16:
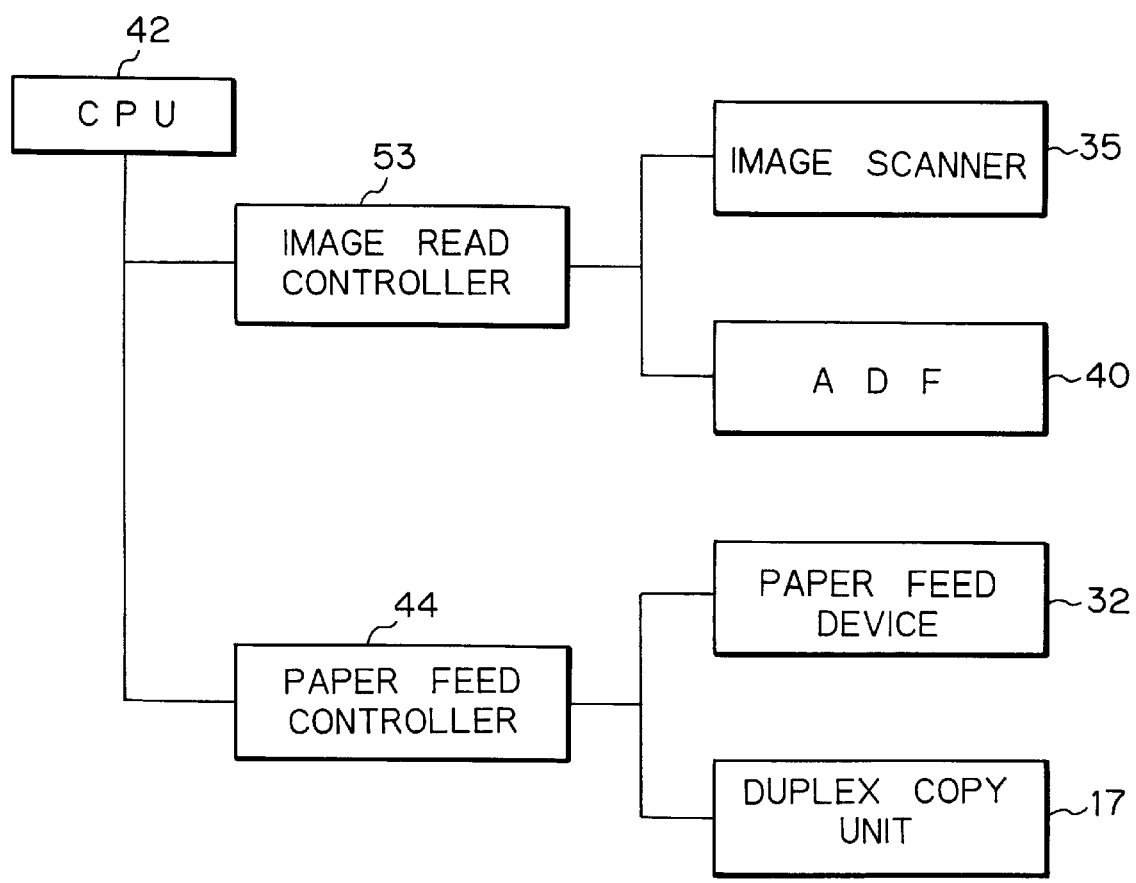
FIG. 16 is a block diagram schematically showing a part of circuitry included in the embodiment of FIG. 15.

A further embodiment of the present invention will be described with reference to FIGS. 15 and 16. As shown in FIG. 16, the read controller or control means for controlling the scanner 35 and ADF or document turning means 40 and the paper feed controller 44 are connected to the CPU 42. How this embodiment reproduces both sides of a single document on both sides of a number of papers in a so-called duplex-duplex copy mode will be described with reference also made to FIG. 15. First, the operator sets the document on the tray 41, operates keys arranged on the operation panel, not shown, to input a desired number of copies N (2 or greater integer) and other copy data, and then presses the start key, not shown. In response, the ADF 40 feeds the document with one side or front thereof facing downward and sets it on the glass platen 36. The first paper 47 is fed from the paper feed section 24 (step St. 21).

The scanner 35 reads the front of the document with the result that the front is reproduced on the front of the first paper 47. At this instant, the second paper 48 is fed from the paper feed section 24 (step St. 22).

After the front of the document has bee reproduced on the front of the first paper 47 in the step St. 22, the paper 47 is steered to the duplex copy unit 17 by the path selector 14 and stacked in the turning section 19. At this instant, the scanner 35 reads the front of the document so as to reproduce the front on the front of the second paper 48 (step St. 23).

The second paper 48 is conveyed to the duplex copy unit 17 via the path selector 14. The conveying section 18 conveys the paper 48 by way of the first and second sensors 20 and 21. Because the first paper 47 exists in the turning section 19, the second paper 48 is stacked in the conveying section 18. Then, the stepping motor 19 of the turning section 19 is driven in the reverse direction for thereby refeeding the first paper 47 from the duplex copy unit 17. When the first paper 47 is fully driven out of the turning section 19, the second paper 48 is conveyed to the turning section 19 and stacked there (step St. 24).

Whether or not the N-th paper has been fed from the paper feed section 24 is determined (step St. 25). If the N-th paper has not been fed from the paper feed section 24 yet (NO, step St. 25), the first paper 47 is again conveyed to the registration roller pair 12 such that its leading edge meets the leading edge of an image to be formed on the drum 3. Subsequently, the ADF or document turning means 40 turns over the document and sets it on the glass platen 36 with the other side or rear of the document facing downward. The optics of the scanner 35 is brought to the position for starting reading the document. As a result, the rear of the document is reproduced on the rear of the first paper 47. At this instant, the scanner 35 reads the rear of the document, and then the ADF 40 turns over the document such that its front again faces downward. The third paper 49 is fed from the paper feed section 24 such that it reaches the registration roller pair 12 when the optics of the scanner 35 is shifted to the position for starting reading the document (step St. 26).

The first paper 47 carrying the images of the front and rear of the document on both sides thereof in the step St. 26 is steered by the path selector 14 to the paper outlet section 33 and then driven out of the copier by the outlet roller pair 34. At this instant, the front of the document is reproduced on the front of the third paper 49 (step St. 27). The third paper 49 carrying the image on its front is conveyed to the duplex copy unit 17. Subsequently, the steps St. 24 through St. 27 are repeated. In the steps St. 24 and 26, papers are alternately fed from the paper feed section 24 and duplex copy tray 27 such that it reaches the registration roller pair 12 when the optics of the scanner 35 is brought to the position for reading the document turned over by the ADF 40.

When the N-th paper is fed from the first paper feed section 24 (YES, step S25), the ADF 40 turns over the document, i.e., causes its rear to face downward and lays it on the glass platen 36. As the scanner 35 reads the rear of the document, the rear of the document is reproduced on the rear of the (N-1)th paper refed from the duplex copy unit 17. The N-th paper is refed from the duplex copy unit 17 such that it reaches the registration roller pair 12 when the optics of the scanner 35 is again brought to the position for starting reading the document (step St. 28). After both sides of the document have been reproduced on both sides of the (N-1)-th paper in the step St. 28, the (N-1)-th paper is steered by the path selector 14 to the paper outlet section 33 and then driven out of the copier by the outlet roller pair 34. At this instant, the scanner 35 reads the rear of the document with the result that the rear is reproduced on the rear of the N-th paper (step St. 29). The N-th paper carrying the images of the front and rear of the document on both sides thereof is also steered by the path selector 14 to the paper outlet section 33 and then driven out by the outlet roller pair 34 (step St. 30).

As stated above, after the front of the document has been reproduced on the front of the first paper 47, the paper 47 is stacked in the duplex copy unit 17. Thereafter, the papers are alternately fed from the paper feed section 24 and duplex copy unit 17 one at a time. As a result, the front and rear of the document are formed on both sides of the N papers. Specifically, the read control section 43 so controls the scanner 35 and ADF 40 as to sequentially read the front, front, rear, front, rear, front, . . . , front, rear and rear of the document in this order. At the same time, the paper feed controller 44 so controls the paper feed device 32 and duplex copy unit 17 as to sequentially feed the first paper carrying no images, second paper carrying no images, first paper carrying an image on its front, third paper carrying no images, second paper carrying an image on its front, fourth paper carrying no images, . . . , N-th paper carrying no images, (N-1)-th paper carrying an image on its front, and N-th paper carrying an image on its front in this order. As a result, the image forming section 2 sequentially reproduces both sides of the document on the front of the first paper, the front of the second paper, the rear of the first paper, the front of the third paper, the rear of the second paper, the front of the fourth paper, . . . , the front of the N-th paper, the rear of the (N-1)-th paper, and the rear of the N-th paper. Such a procedure reduces the apparent interval between the consecutive papers without resorting to a memory, thereby reducing the overall copying time. This successfully enhances productivity despite that the duplex copy unit 17 has a simple and inexpensive configuration, as in the previous embodiment.

While the embodiment has concentrated on a single document set on the tray 41, a plurality of documents may be stacked on the tray 41. For example, when M documents are stacked on the tray 41, then they will be fed to and set on the glass platen 36 one by one. This will be followed by the above-described procedure in order to reproduce opposite sides of each of M documents on both sides of a number of copies. Of course, not the ADF 40 but the operator may lay the document 50 on the glass platen by hand.

In the illustrative embodiment, a single document 50 has its both sides reproduced on both sides of N papers. Alternatively, assume that use is made of a copier having a memory for storing the images of documents read by a scanner. Then, the both sides of the second document and successive documents following the first document may be reproduced on both sides of N papers. In such a case, if the answer of the step St. 25 is positive (YES), then the first paper for reproducing both sides of the second document on both sides thereof is fed from the paper feed section 24 when the rear of the first document is reproduced on the rear of the (N–1)-th paper in the step St. 28. When the (N–1)-th paper is driven out of the copier, the front of the second document is reproduced on the front of the first paper. When the N-th paper is fed from the duplex copy unit 17, the first paper is stacked on the turning section 19. Subsequently, when the rear of the first document is reproduced on the N-th paper, the second paper for reproducing both sides of the second document is fed from the paper feed section 24. When the N-th paper is driven out of the copier, the first paper is refed from the duplex copy unit 17. This is followed by the previously stated steps St. 24 to St. 30 in order to reproduce both sides of the second document on both sides of the N papers. The above procedure may be repeated with the third and successive documents.

All the embodiments shown and described are assumed to feed papers from the first paper feed section 24. Alternatively, papers may be fed from the second paper feed section 28. The copier 1 may, of course, be implemented as an analog copier so long as it includes a duplex copy unit. In the case of an analog copier, the image scanner is implemented as an exposing unit which illuminates a document and focuses the resulting reflection onto the drum 3. If desired, use may be made of a memory unit in the form of a frame memory and implemented by a RAM (Random Access Memory) capable of storing image data output from the scanner 35. The memory unit will be connected to the image processing section on the one hand and to the LD 7 on the other hand.

In summary, in accordance with the present invention, an image scanner reads the first document. When a paper is fed from a paper feed section, an image forming section reproduces the image of the first document on one side of the paper. The paper with the image of the first document is stacked in a duplex copy unit. Then, the scanner reads the first document and a second document alternately while the paper in the duplex copy unit and another paper in the paper feed section are fed alternately. The procedure for causing the image forming section to reproduce the first document on one side of a paper and stacking the paper in the duplex copy unit and the procedure for causing it to reproduce second document on the other side or rear of the paper carrying the first document image and discharging the paper are effected alternately with each other. Finally, the scanner reads the second document, and the paper is refed from the duplex copy unit. As a result, the second document is reproduced on the rear of the paper carrying the first document image, and the paper is discharged. In this manner, when the images of two documents are reproduced on both sides of a number of papers, the operation for stacking the paper carrying an image on one side thereof in the duplex copy unit and the operation for causing the image forming section to reproduce the document on one side of a new paper are performed at the same time. This successfully reduces the overall copying time and thereby enhances productivity.

Also, in accordance with the present invention, the image scanner reads the first half of a document. When a paper is fed from the paper feed section, the image forming section reproduces the image of the first half on one side of the paper. The paper with the image of the first half is stacked in the duplex copy unit. Then, the scanner reads the first and second halves of the document alternately while the paper in the duplex copy unit and a new paper in the paper feed section are fed alternately. The procedure for causing the image forming section to reproduce the first half on one side of a paper and stacking the paper in the duplex copy unit and the procedure for causing it to reproduce second half on the other side or rear of the paper carrying the first half image and discharging the paper are effected alternately with each other. Finally, the scanner reads the second half, and the paper is refed from the duplex copy unit. As a result, the second half is reproduced on the rear of the paper carrying the first half image, and the paper is discharged. In this manner, when a single image divided into two and has the two halves reproduced on both sides of a number of papers, the operation for stacking the paper carrying an image on one side thereof in the duplex copy unit and the operation for causing the image forming section to reproduce the document on one side of a new paper are performed at the same time. This successfully reduces the overall copying time and thereby enhances productivity.

Further, in accordance with the present invention, the image scanner reads one side of a document. When a paper is fed from the paper feed section, the image forming section reproduces the image of the one side of the document on one side of the paper. The paper with the image of the one side is stacked in the duplex copy unit. After a document turning section has turned over the document, the scanner reads the one side and the other side of the document alternately while the paper in the duplex copy unit and a new paper in the paper feed section are fed alternately. The procedure for causing the image forming section to reproduce one side of a document on one side of a paper and stacking the paper in the duplex copy unit and the procedure for causing it to reproduce the other side on the other side or rear of the paper carrying the one side image and discharging the paper are effected alternately with each other. Finally, the scanner reads the other side of the document, and the paper is refed from the duplex copy unit. As a result, the other side of the document is reproduced on the rear of the paper carrying the one side image, and the paper is discharged. In this manner, when both sides of a single document are reproduced on both sides of a number of papers, the operation for stacking the paper carrying an image on one side thereof in the duplex copy unit and the operation for causing the image forming section to reproduce the document on one side of a new paper are performed at the same time. This successfully reduces the overall copying time and thereby enhances productivity.

Various modifications will become possible for those skilled in the art after receiving the teachings of the present disclosure without departing from the scope thereof.

What is claimed is:

1. A copier comprising:

an image reading device for reading a first document and a second document;

a feeding device for feeding recording media one at a time;

an image forming section for forming an image on the recording medium on the basis of an image read by said image reading device;

a duplex copy unit for turning over the recording medium carrying the image formed by said image forming section on one side, and refeeding said recording medium to said image forming section;

image read control means for controlling said image reading device such that said image reading device reads the first document, then reads said first document and the second document alternately, and finally reads said second document; and feed control means for controlling said feeding device and said duplex copy unit such that one recording medium is fed from said feeding device, then the recording media are alternately fed from said feeding device and said duplex copy unit one at a time, and finally one recording medium is fed from said duplex copy unit;

wherein said duplex copy unit comprises a turning section for turning over a paper entering said duplex copy unit;

a stacking section for storing papers entering said duplex copy unit when a paper is currently in said turning section;

a sensing unit for sensing if a paper is located in said turning section; and a directing mechanism for directing a paper entering said duplex copy unit to said turning section if said sensing unit does not sense a paper treated in said turning section, and directs said paper entering said duplex copy unit to said stacking section if said sensing unit senses a paper in said turning section.

2. A copier as claimed in claim 1, wherein said image reading device comprises an exposing unit for illuminating a document and focusing a resulting reflection from said document onto said image forming section to thereby electrostatically form a latent image.

3. A copier comprising:

an image reading device for reading a first half and a second half of a single document;

a feeding device for feeding recording media one at a time;

an image forming section for forming an image on the recording medium on the basis of an image read by said image reading device;

a duplex copy unit for turning over the recording medium carrying the image formed by said image forming section on one side, and refeeding said recording medium to said image forming section;

image read control means for controlling said image reading device such that said image reading device reads the first half of the document, then reads said first half and the second half alternately, and finally reads said second half; and feed control means for controlling said feeding device and said duplex copy unit such that one recording medium is fed from said feeding device, then the recording media are alternately fed from said feeding device and said duplex copy unit one at a time, and finally one recording medium is fed from said duplex copy unit;

wherein said duplex copy unit comprises a turning section for turning over a paper entering said duplex copy unit;

a stacking section for storing papers entering said duplex copy unit when a paper is currently in said turning section;

a sensing unit for sensing if a paper is located in said turning section; and a directing mechanism for directing a paper entering said duplex copy unit to said turning section if said sensing unit does not sense a paper treated in said turning section, and directs said paper entering said duplex copy unit to said stacking section if said sensing unit senses a paper in said turning section.

4. A copier as claimed in claim 3, wherein said image reading device comprises an exposing unit for illuminating a document and focusing a resulting reflection from said document onto said image forming section to thereby electrostatically form a latent image.

5. A copier comprising:

an image reading device for reading a document;

document turning means for turning over the document;

a feeding device for feeding recording media one at a time;

an image forming section for forming an image on the recording medium on the basis of an image read by said image reading device;

a duplex copy unit for turning over the recording medium carrying the image formed by said image forming section on one side, and refeeding said recording medium to said image forming section;

image read control means for controlling said document turning means and said image reading device such that said image reading device reacts one side of the document, then reads said one side and the other side alternately, and finally reads said other side; and feed control means for controlling said feeding device and said duplex copy unit such that one recording medium is fed from said feeding device, then the recording media are alternately fed from said feeding device and said duplex copy unit one at a time, and finally one recording medium is fed from said duplex copy unit;

wherein said duplex copy unit comprises a turning section for turning over a paper entering said duplex copy unit;

a stacking section for storing papers entering said duplex copy unit when a paper is currently in said turning section;

a sensing unit for sensing if a paper is located in said turning section; and a directing mechanism for directing a paper entering said duplex copy unit to said turning section if said sensing unit does not sense a paper treated in said turning section, and directs said paper entering said duplex copy unit to said stacking section if said sensing unit senses a paper in said turning section.

6. A copier as claimed in claim 5, wherein said image reading device comprises an exposing unit for illuminating a document and focusing a resulting reflection from said document onto said image forming section to thereby electrostatically form a latent image.

* * * * *